(12) United States Patent
Fujioka et al.

(10) Patent No.: US 9,864,262 B2
(45) Date of Patent: Jan. 9, 2018

(54) IMAGE PROJECTION DEVICE AND IMAGE PROJECTION METHOD TO CONTROL AN ILLUMINATION AREA BASED ON MOVEMENT OF IMAGE GENERATING UNIT

(71) Applicants: Tetsuya Fujioka, Kanagawa (JP); Akihisa Mikawa, Kanagawa (JP); Hideo Kanai, Tokyo (JP); Yasunari Mikutsu, Tokyo (JP); Satoshi Tsuchiya, Kanagawa (JP); Jun Mashimo, Tokyo (JP); Yoshio Kubo, Tokyo (JP)

(72) Inventors: Tetsuya Fujioka, Kanagawa (JP); Akihisa Mikawa, Kanagawa (JP); Hideo Kanai, Tokyo (JP); Yasunari Mikutsu, Tokyo (JP); Satoshi Tsuchiya, Kanagawa (JP); Jun Mashimo, Tokyo (JP); Yoshio Kubo, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/939,348

(22) Filed: Nov. 12, 2015

(65) Prior Publication Data

US 2016/0154294 A1 Jun. 2, 2016

(30) Foreign Application Priority Data

Nov. 28, 2014 (JP) .................................. 2014-242034
Nov. 28, 2014 (JP) .................................. 2014-242043

(51) Int. Cl.
*G03B 21/20* (2006.01)
*G03B 5/00* (2006.01)
(Continued)

(52) U.S. Cl.
CPC ..... *G03B 21/2046* (2013.01); *G02B 27/0025* (2013.01); *G03B 5/00* (2013.01);
(Continued)

(58) Field of Classification Search
CPC .. G03B 21/142; G03B 21/145; G03B 21/147; G03B 21/2046; G03B 21/208; G03B 21/2093
See application file for complete search history.

(56) References Cited

U.S. PATENT DOCUMENTS 5,800,032 A * 9/1998 Uchiyama ............ G03B 21/145
348/E5.141
5,984,478 A * 11/1999 Doany ................. G02B 26/008
348/743

(Continued)

FOREIGN PATENT DOCUMENTS

CN 101038428 A 9/2007
JP 2000-047325 2/2000

(Continued)

OTHER PUBLICATIONS

Extended European Search Report dated Apr. 6, 2016 in Patent Application No. 15192997.3.

(Continued)

*Primary Examiner* — Bao-Luan Le
(74) *Attorney, Agent, or Firm* — Oblon, McClelland, Maier & Neustadt, L.L.P.

(57) ABSTRACT

An image projection device includes: an image generating unit that includes an optical modulation element generating an image using light emitted from a light source; an illumination optical unit that includes one or more optical elements guiding the light emitted from the light source to the image generating unit; a projecting unit that projects the image generated by the image generating unit; a first control (Continued)

unit that performs control to move the image generating unit movable with respect to the illumination optical unit; and a second control unit that performs control to move an illumination area indicating an area illuminated with the light guided to the image generating unit by the illumination optical unit according to a movement amount of the image generating unit.

11 Claims, 18 Drawing Sheets

(51) Int. Cl.
  *G02B 27/00* (2006.01)
  *H04N 9/31* (2006.01)
  *G03B 21/00* (2006.01)
  *G03B 21/14* (2006.01)
(52) U.S. Cl.
  CPC ......... *G03B 21/005* (2013.01); *G03B 21/142* (2013.01); *G03B 21/208* (2013.01); *G03B 21/2066* (2013.01); *H04N 9/317* (2013.01); *H04N 9/3188* (2013.01); *G03B 21/008* (2013.01); *G03B 21/147* (2013.01); *G03B 2205/0069* (2013.01)

(56) References Cited

U.S. PATENT DOCUMENTS

| | | | | |
|---|---|---|---|---|
| 6,139,156 A * | 10/2000 | Okamori | ............ | G02B 27/0927 348/E9.027 |
| 6,264,333 B1 * | 7/2001 | Iizuka | ............ | G03B 21/28 348/771 |
| 6,281,949 B1 | 8/2001 | Matsui et al. | | |
| 6,361,171 B1 * | 3/2002 | Ejiri | ............ | G03B 21/14 348/744 |
| 7,237,903 B2 * | 7/2007 | Nagayoshi | ............ | G09G 3/2092 348/747 |
| 7,824,039 B2 * | 11/2010 | Takito | ............ | G03B 21/10 345/156 |
| 7,850,314 B2 * | 12/2010 | Sawai | ............ | G03B 21/2013 353/98 |
| 7,911,411 B2 * | 3/2011 | Yoshikawa | ............ | G03B 21/008 345/32 |
| 7,946,714 B2 * | 5/2011 | Kawakami | ............ | G02B 13/16 353/101 |
| 8,152,313 B2 * | 4/2012 | Amano | ............ | G03B 3/00 348/745 |
| 8,226,248 B2 * | 7/2012 | Amano | ............ | G03B 21/142 353/101 |
| 8,820,941 B2 * | 9/2014 | Yang | ............ | H04N 13/0427 348/771 |
| 8,894,212 B2 * | 11/2014 | Seo | ............ | H04N 9/3152 353/102 |
| 9,151,955 B2 * | 10/2015 | Chiu | ............ | G02B 27/0933 |
| 9,423,679 B2 * | 8/2016 | Magg | ............ | G01J 1/4257 |
| 2001/0022613 A1 | 9/2001 | Matsui et al. | | |
| 2005/0168698 A1 * | 8/2005 | Nagayoshi | ............ | G09G 3/2092 353/30 |
| 2006/0092389 A1 * | 5/2006 | Wang | ............ | G02B 27/0994 353/99 |
| 2007/0201235 A1 * | 8/2007 | Sawai | ............ | G03B 21/2033 362/341 |
| 2007/0216879 A1 * | 9/2007 | Yoshikawa | ............ | G03B 21/008 353/99 |
| 2008/0111976 A1 * | 5/2008 | Takito | ............ | G03B 21/10 353/121 |
| 2008/0231813 A1 * | 9/2008 | Kawakami | ............ | G02B 13/16 353/70 |
| 2009/0279055 A1 * | 11/2009 | Amano | ............ | G03B 3/00 353/101 |
| 2010/0171938 A1 * | 7/2010 | Amano | ............ | G03B 21/142 353/119 |
| 2011/0242491 A1 * | 10/2011 | Seo | ............ | H04N 9/3152 353/20 |
| 2013/0003027 A1 * | 1/2013 | Yang | ............ | H04N 13/0427 353/87 |
| 2014/0185020 A1 * | 7/2014 | Magg | ............ | G01J 1/4257 353/87 |

FOREIGN PATENT DOCUMENTS

| | | |
|---|---|---|
| JP | 2004-45718 A | 2/2004 |
| JP | 2004-336616 | 11/2004 |
| JP | 2007-256321 | 10/2007 |
| JP | 2007-310277 A | 11/2007 |
| JP | 2009-3107 A | 1/2009 |
| JP | 2014-134729 | 7/2014 |

OTHER PUBLICATIONS

Combined Office Action and Search Report dated Mar. 31, 2017 in Chinese Patent Application No. 201510836423.1 with English translation.

* cited by examiner

IMAGE PROJECTION DEVICE AND IMAGE PROJECTION METHOD TO CONTROL AN ILLUMINATION AREA BASED ON MOVEMENT OF IMAGE GENERATING UNIT

CROSS-REFERENCE TO RELATED APPLICATIONS

The present application claims priority to and incorporates by reference the entire contents of Japanese Patent Application No. 2014-242034 filed in Japan on Nov. 28, 2014 and Japanese Patent Application No. 2014-242043 filed in Japan on Nov. 28, 2014.

BACKGROUND OF THE INVENTION

1. Field of the Invention

The present invention relates to an image projection device and an image projection method.

2. Description of the Related Art

An image projection device (typically, a projector) is known in which an image generating unit generates an image using light emitted from a light source based on image data transmitted from a personal computer, a digital camera, or the like, and the generated image is projected to a screen or the like through an optical system including a plurality of lenses. To facilitate adjustment of the image projection device at the time of its installation, a technique is known in which a relative position between an optical modulation element that modulates light emitted from the light source based on an image signal and a projection optical system that projects the light transmitted through the optical modulation element is changed.

For example, Japanese Laid-open Patent Publication No. 2014-134729 discloses a configuration to drive a relative movement mechanism configured to change, when a change in an attitude of a device body is detected, a relative position of an optical modulation element and a projection optical system such that the center of the base of a projected image and the optical axis of projected light coincide with each other in order to facilitate adjustment of a projector at the time of its installation.

Conventionally, however, illumination light to be irradiated to the optical modulation element needs to illuminate the whole area of a movable range of the optical modulation element. Therefore, there is a problem that an illumination efficiency of the illumination light is reduced because any area (which does not originally require illumination) other than the optical modulation element is also irradiated with the illumination light.

SUMMARY OF THE INVENTION

It is an object of the present invention to at least partially solve the problems in the conventional technology.

An image projection device includes: an image generating unit that includes an optical modulation element generating an image using light emitted from a light source; an illumination optical unit that includes one or more optical elements guiding the light emitted from the light source to the image generating unit; a projecting unit that projects the image generated by the image generating unit; a first control unit that performs control to move the image generating unit movable with respect to the illumination optical unit; and a second control unit that performs control to move an illumination area indicating an area illuminated with the light guided to the image generating unit by the illumination optical unit according to a movement amount of the image generating unit.

An image projection method is performed by an image projection device that includes: an image generating unit that includes an optical modulation element generating an image using light emitted from a light source; an illumination optical unit that includes one or more optical elements guiding the light emitted from the light source to the image generating unit; and a projecting unit that projects the image generated by the image generating unit. The image projection method includes: first performing control to move the image generating unit movable with respect to the illumination optical unit; and second performing control to move an illumination area indicating an area illuminated with the light guided to the image generating unit by the illumination optical unit according to a movement amount of the image generating unit.

An image projection device includes: an image generating unit that includes an optical modulation element generating an image using light emitted from a light source; an illumination optical unit that includes one or more optical elements guiding the light emitted from the light source to the image generating unit; a projecting unit that projects the image generated by the image generating unit; a first control unit that performs control to rotate the image generating unit rotatable with respect to the illumination optical unit; and a second control unit that performs control to rotate an illumination area indicating an area illuminated with the light guided to the image generating unit by the illumination optical unit according to a rotation amount of the image generating unit.

An image projection method is performed by an image projection device that includes: an image generating unit that includes an optical modulation element generating an image using light emitted from a light source; an illumination optical unit that includes one or more optical elements guiding the light emitted from the light source to the image generating unit; and a projecting unit that projects the image generated by the image generating unit. The image projection method includes: first performing control to rotate the image generating unit rotatable with respect to the illumination optical unit; and second performing control to rotate an illumination area indicating an area illuminated with the light guided to the image generating unit by the illumination optical unit according to a rotation amount of the image generating unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
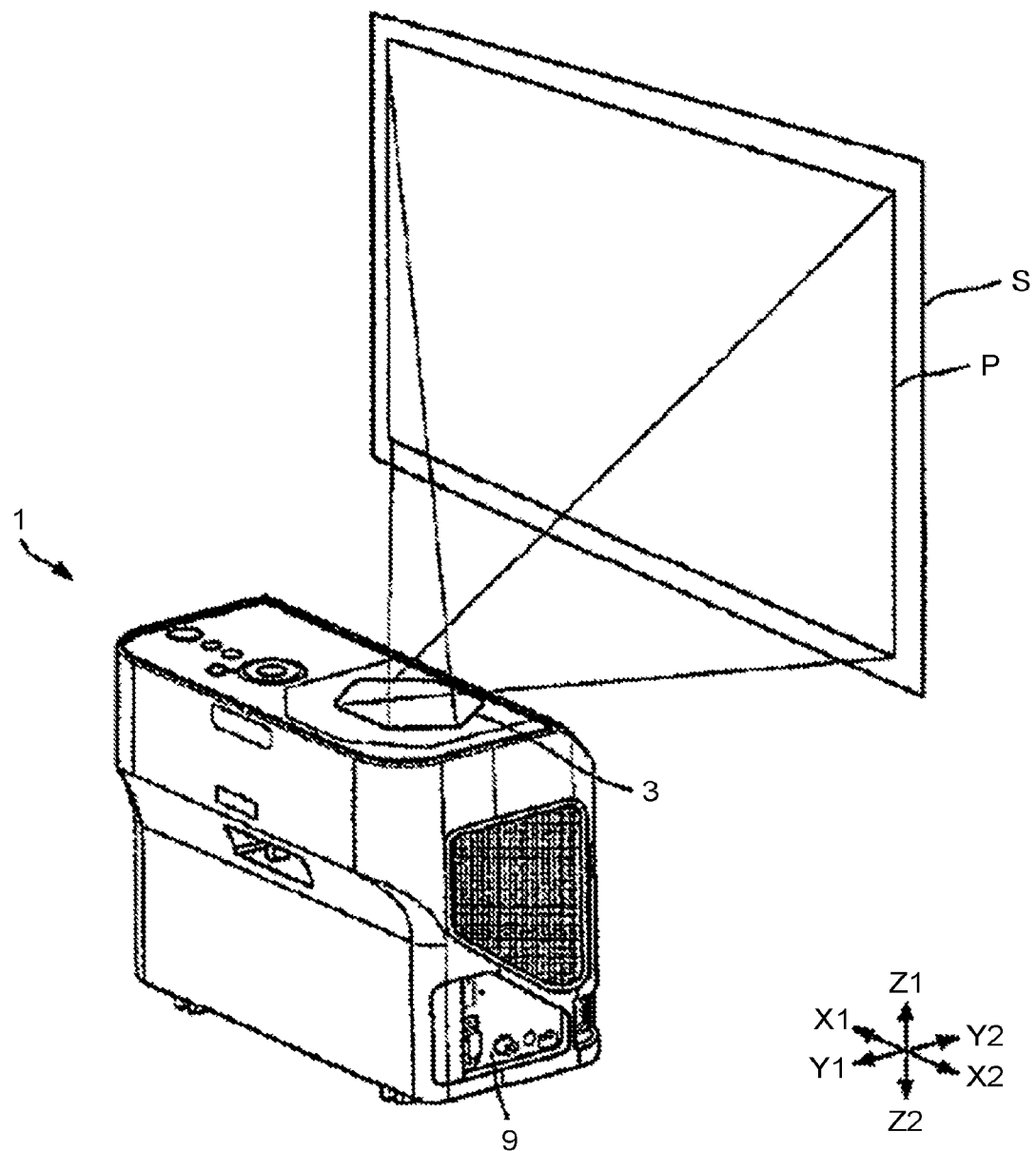
FIG. 1 is a diagram of an image projection device according to an embodiment.

Embodiments for executing the invention will be explained below with reference to the accompanying drawings. It may be that the same components are assigned with the same reference signs in the drawings and overlapping description is omitted.

Configuration of Image Projection Device

FIG. 1 is a diagram of a projector 1 according to an embodiment.

The projector 1 is an example of an image projection device, includes an emission window 3 and an external interface (I/F) 9, and is internally provided with an optical engine for generating a projection image. In the projector 1, for example, when image data is transmitted from a personal computer or a digital camera connected to the external I/F 9, the optical engine generates a projection image based on the received image data and projects the image from the emission window 3 to a screen S as illustrated in FIG. 1.

In the drawings below, an X1X2 direction is a width direction of the projector 1, a Y1Y2 direction is a depth direction thereof, and a Z1Z2 direction is a height direction thereof. The side where the emission window 3 of the projector 1 is provided may be described as an upper side and the side opposite to the emission window 3 may be described as a lower side.

Figure 2:
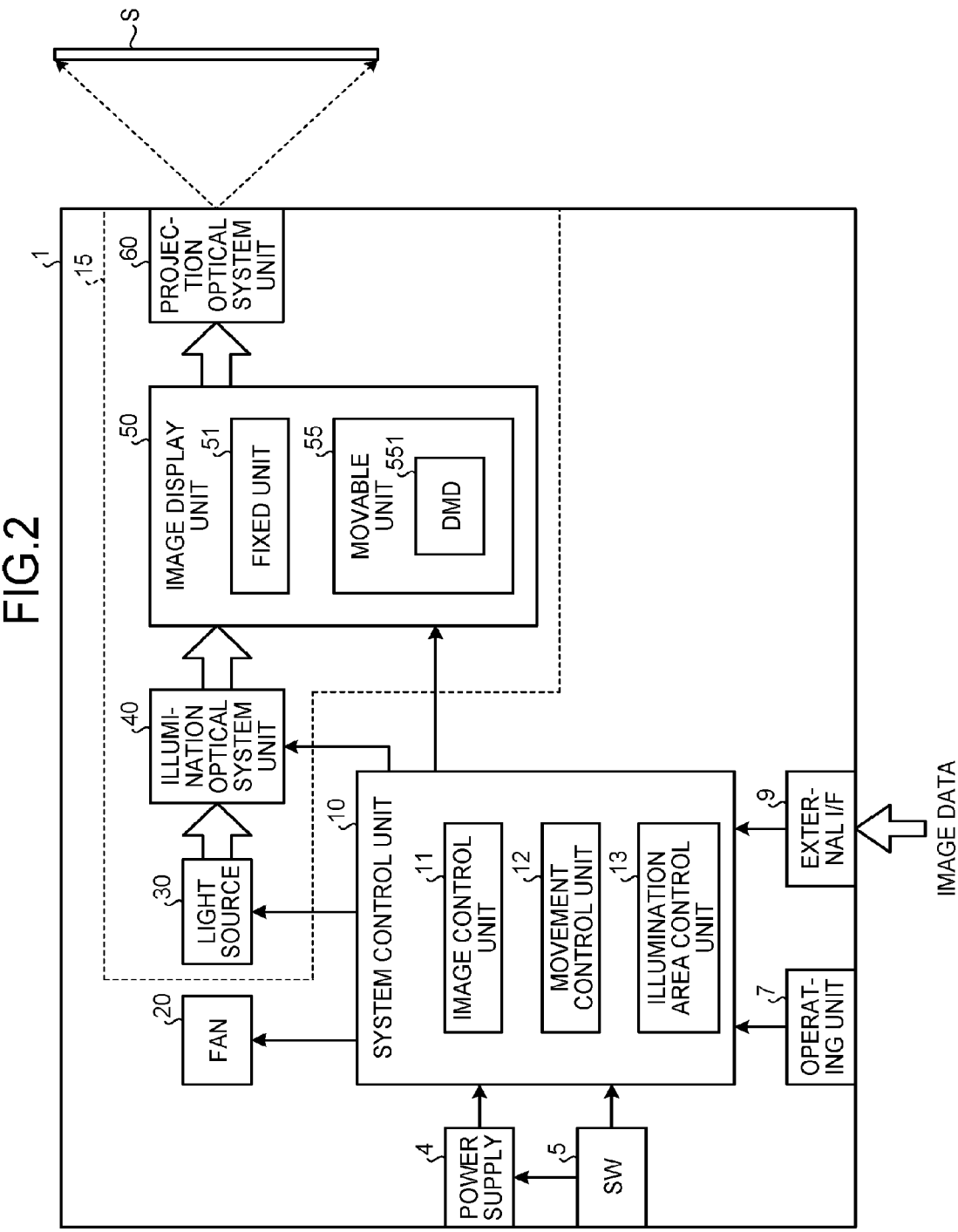
FIG. 2 is a block diagram of a functional configuration of the image projection device according to the embodiment.

FIG. 2 is a block diagram of a functional configuration of the projector 1 according to the embodiment.

As illustrated in FIG. 2, the projector 1 includes a power supply 4, a main switch SW5, an operating unit 7, the external I/F 9, a system control unit 10, a fan 20, and an optical engine 15.

The power supply 4 is connected to a commercial power supply, converts a voltage and a frequency to those for an internal circuit of the projector 1, and supplies power to the system control unit 10, the fan 20, the optical engine 15, and so on.

The main switch SW5 is used by a user to perform an on/off operation of the projector 1. When the main switch SW5 is turned on when the power supply 4 is connected to the commercial power supply through a power cord or the like, the power supply 4 starts to supply power to units of the projector 1, and when the main switch SW5 is turned off, the power supply 4 stops the supply of power to the units of the projector 1.

The operating unit 7 is a button and/or the like that accept various operations performed by the user, and is provided on, for example, the upper surface of the projector 1. The operating unit 7 accepts a user operation such as a size, a color tone, and focus adjustment of a projection image. The user operation accepted by the operating unit 7 is transmitted to the system control unit 10.

The external I/F 9 has a connection terminal connected to, for example, a personal computer or a digital camera, and outputs image data transmitted from the connected device to the system control unit 10.

The system control unit 10 includes an image control unit 11, a movement control unit 12, and an illumination area control unit 13. For the sake of convenience in description, the functions according to the present invention are mainly exemplified herein; however, the functions included in the system control unit 10 are not limited thereto. In the present embodiment, the system control unit 10 includes, for example, a central processing unit (CPU), a read-only memory (ROM), and a random access memory (RAM), and the functions of the units of the system control unit 10 (the image control unit 11, the movement control unit 12, and the illumination area control unit 13) are implemented by the CPU executing programs stored in the ROM in cooperation with the RAM. However, not limited thereto, A configuration in which, for example, at least part of the functions of the units of the system control unit 10 (the image control unit 11, the movement control unit 12, and the illumination area control unit 13) is implemented by a dedicated hardware circuit (a semiconductor integrated circuit etc.), may be employed.

The program executed by the system control unit 10 according to the present embodiment may be configured to be provided by being recorded in a computer-readable recording medium such as a compact disk read only memory (CD-ROM), a flexible disk (FD), compact disk recordable (CD-R), a digital versatile disk (DVD), and a Universal Serial Bus (USB) in a file of an installable format or of an executable format. Alternatively, the program may be configured to be provided or distributed through a network such as the Internet. Moreover, various programs may be configured to be provided by being preinstalled into a non-volatile recording medium such as ROM.

The image control unit 11 controls a digital micromirror device (DMD) 551 provided in an image display unit 50 of the optical engine 15 based on the image data input through the external I/F 9 to generate an image to be projected to the screen S. The DMD 551 is an example of the optical modulation element, and generates an image by using light emitted from a light source 30 explained later. The image display unit 50 is an example of an image generating unit. More specific content is explained later.

The movement control unit 12 is an example of a first control unit, and moves a movable unit 55 movably provided in the image display unit 50 to control the position of the DMD 551 provided in the movable unit 55. Although details thereof are explained later, in this example, the image display unit 50 is movable with respect to an illumination optical system unit 40, explained later, and the movement control unit 12 performs control to move the image display unit 50.

The illumination area control unit 13 is an example of a second control unit, and performs control to move an illumination area indicating an area illuminated with the light guided to the image display unit 50 by the illumination optical system unit 40, explained later, according to a movement amount of the image display unit 50. More specific content is explained later.

The fan 20 is controlled by the system control unit 10 to rotate and cools the light source 30 of the optical engine 15.

The optical engine 15 includes the light source 30, the illumination optical system unit 40, the image display unit 50, and a projection optical system unit 60, and is controlled by the system control unit 10 to project an image to the screen S.

The light source 30 is, for example, a high-pressure mercury lamp, a Xenon lamp, and a light-emitting diode (LED), and is controlled by the system control unit 10 to irradiate the illumination optical system unit 40 with the light.

The illumination optical system unit 40 is an example of an illumination optical unit, and includes one or more optical elements in order to guide the light emitted from the light source 30 to the image display unit 50. Although details thereof are explained later, in the present embodiment, the illumination optical system unit 40 includes a color wheel, a light tunnel, a relay lens, and the like, and guides the light emitted from the light source 30 to the DMD 551 provided in the image display unit 50.

The image display unit 50 includes a fixed unit 51 fixedly supported, and the movable unit 55 provided movably with respect to the fixed unit 51. The movable unit 55 includes the DMD 551, and the position of the movable unit 55 with respect to the fixed unit 51 is controlled by the movement control unit 12 of the system control unit 10. The DMD 551 is controlled by the image control unit 11 of the system control unit 10, and modulates the light guided by the illumination optical system unit 40 to generate a projection image.

The projection optical system unit 60 is an example of a projecting unit, and projects the image generated by the image display unit 50. For example, the projection optical system unit 60 includes a plurality of projection lenses, mirrors, and/or the like, and enlarges an image generated by the DMD 551 of the image display unit 50 to project the image to the screen S.

Configuration of Optical Engine

A configuration of each unit of the optical engine 15 in the projector 1 will be explained next.

Figure 3:
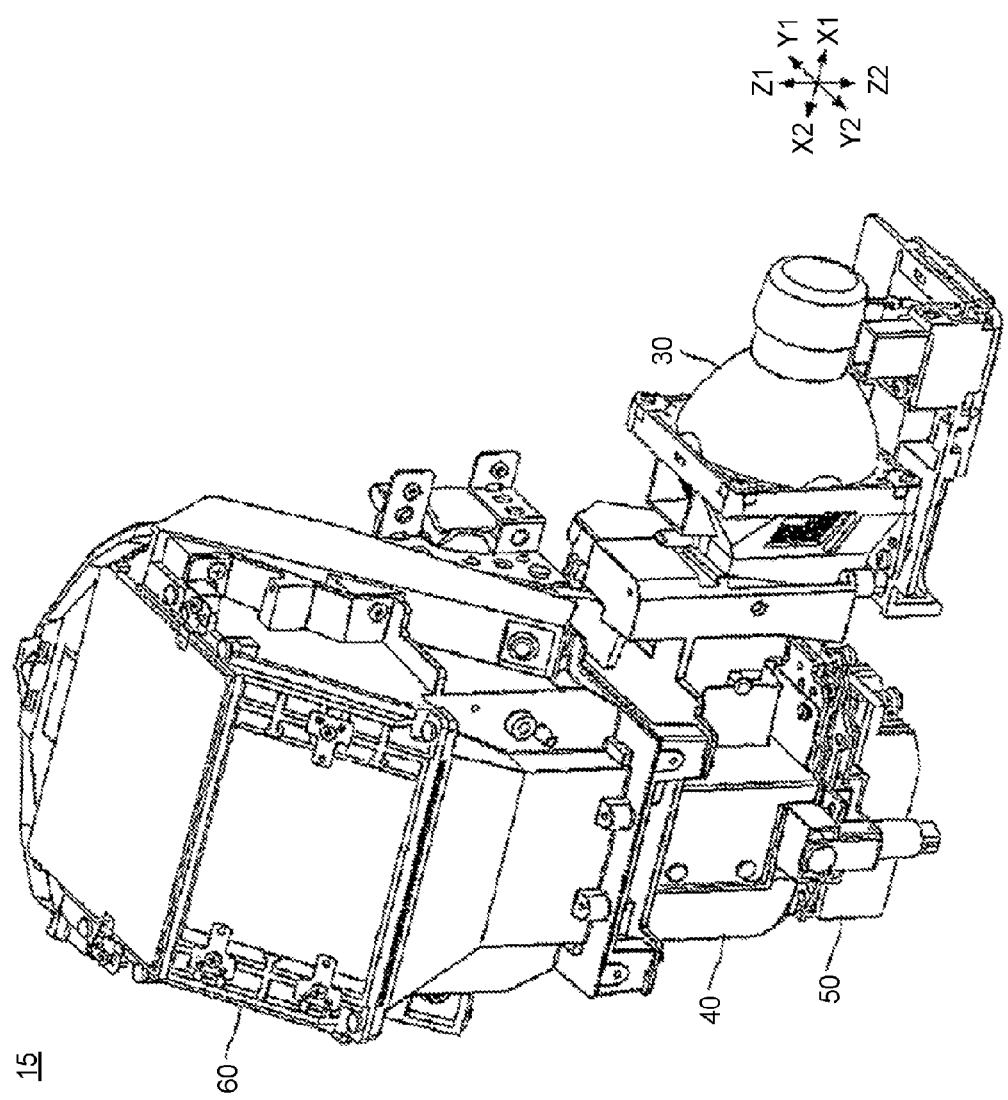
FIG. 3 is a perspective view of an optical engine in the image projection device according to the embodiment.

FIG. 3 is a perspective view of the optical engine 15 according to the embodiment. As illustrated in FIG. 3, the optical engine 15 has the light source 30, the illumination optical system unit 40, the image display unit 50, and the projection optical system unit 60, which are provided inside the projector 1.

The light source 30 is provided at a side of the illumination optical system unit 40, and emits light in the X2 direction. The illumination optical system unit 40 guides the light emitted from the light source 30 to the image display unit 50 provided under. The image display unit 50 uses the light guided by the illumination optical system unit 40 to generate a projection image. The projection optical system unit 60 is provided over the illumination optical system unit 40, and projects the projection image generated by the image display unit 50 to the outside of the projector 1.

The optical engine 15 according to the present embodiment is configured to project the image upward using the light emitted from the light source 30; however, it may also be configured to project the image horizontally.

Projection Optical System Unit

Figure 4:
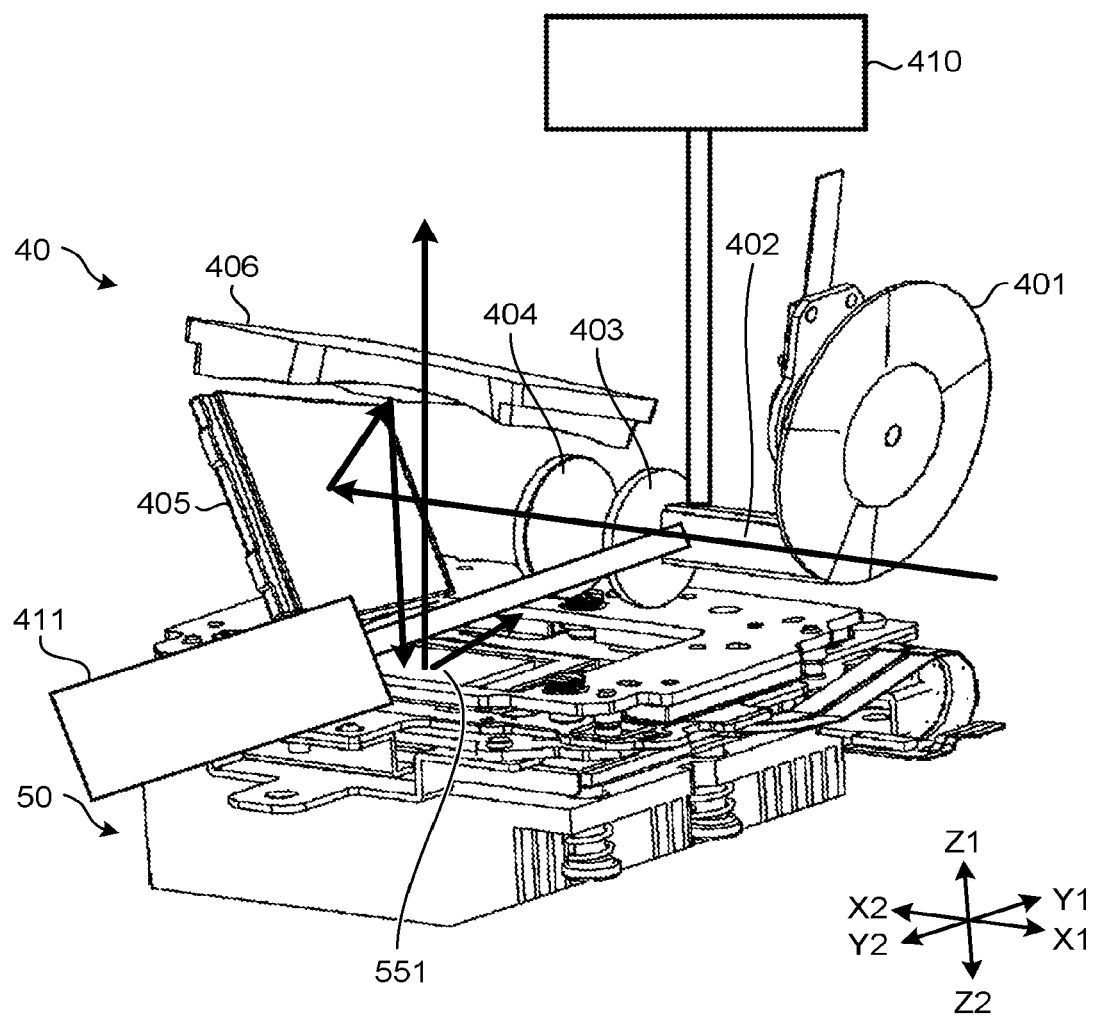
FIG. 4 is a diagram of an illumination optical system unit according to the embodiment.

FIG. 4 is a diagram of the illumination optical system unit 40 according to the embodiment.

As illustrated in FIG. 4, the illumination optical system unit 40 includes a color wheel 401, a light tunnel 402, relay lenses 403 and 404, a cylinder mirror 405, and a concave mirror 406. The illumination optical system unit 40 also includes a first actuator 410, as an example of a first driving unit, for moving the light tunnel 402 in a vertical direction (an example of a first direction, the Z1Z2 direction in the example of FIG. 4). The illumination optical system unit 40 further includes a second actuator 411, as an example of a second driving unit, for moving the light tunnel 402 in a horizontal direction (an example of a second direction, the Y1Y2 direction in the example of FIG. 4) perpendicular to the vertical direction. The first actuator 410 and the second actuator 411 are controlled by the illumination area control unit 13 of the system control unit 10. Specific content of the control (control of movement of an illumination area) by the illumination area control unit 13 is explained later.

The color wheel 401 is a disk in which filters of colors of R (Red), G (Green), and B (Blue) are arranged in different portions in, for example, a circumferential direction. The color wheel 401 is made to rotate in a high speed to divide the light emitted from the light source 30 into the RGB colors in a time division manner.

The light tunnel 402 is an example of a first optical element, which is a cylindrical optical component for making uniform a brightness distribution of the light emitted from the light source 30. More specifically, the light tunnel 402 is a square tubular optical component in which sheet glass is bonded to its inner surface. The light tunnel 402 causes multiple reflections of the RGB color lights passing through the color wheel 401 on its inner surface to make the brightness distribution uniform and guide the light to the relay lenses 403 and 404.

The relay lenses 403 and 404 are examples of a second optical element, and converge the light emitted from the light tunnel 402 while correcting a longitudinal chromatic aberration of the light.

The cylinder mirror 405 and the concave mirror 406 are examples of a third optical element, and reflect the light emitted from the relay lenses 403 and 404 to the DMD 551 provided in the image display unit 50. Here, the light emitted from the light source 30 is enlarged and guided to the DMD 551 by the illumination optical system unit 40. In other words, an image (an image of substantially the same size as that of the DMD 551) formed by the light guided to the DMD 551 is an image obtained by magnifying the image (an image of substantially the same size as that of the cross section of the light tunnel 402 at the exit) formed by the light emitted from the light tunnel 402 by a predetermined magnification (which is determined according to an optical system of the illumination optical system unit 40). In the following, the predetermined magnification is referred to as "enlargement factor E". The DMD 551 modulates the reflected light from the concave mirror 406 to generate a projection image.

Projection Optical System Unit

Figure 5:
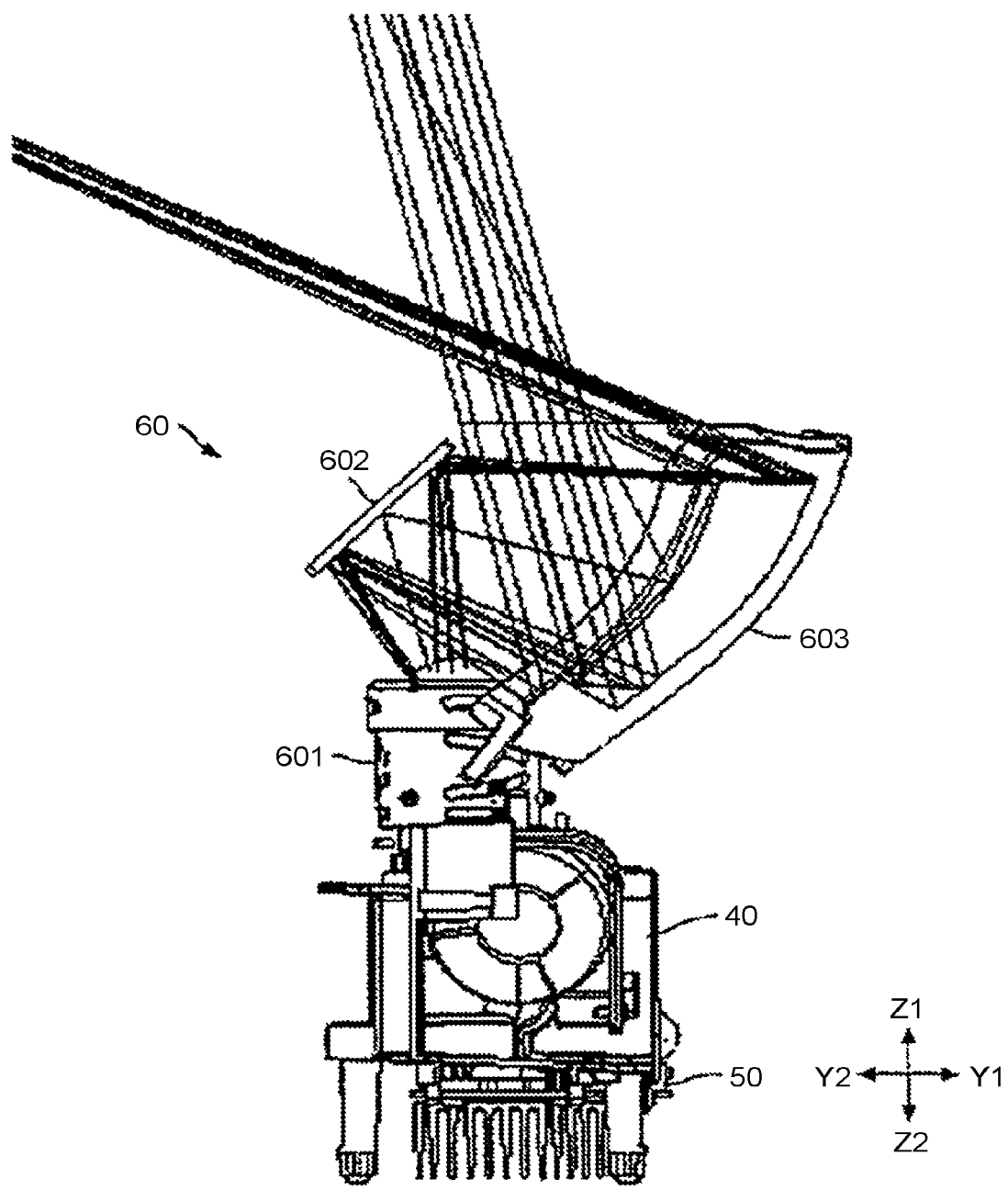
FIG. 5 is a diagram of an internal configuration of a projection optical system unit according to the embodiment.

FIG. 5 is a diagram of an internal configuration of the projection optical system unit 60 according to the embodiment.

As illustrated in FIG. 5, the projection optical system unit 60 has a projection lens 601, a reflecting mirror 602, and a curved mirror 603 which are provided inside a case.

The projection lens 601 includes a plurality of lenses, and forms a projection image generated by the DMD 551 of the image display unit 50 on the reflecting mirror 602. The reflecting mirror 602 and the curved mirror 603 reflect the formed projection image so as to be enlarged and projects the enlarged projection image to the screen S or the like provided outside the projector 1.

Image Display Unit

Figure 6:
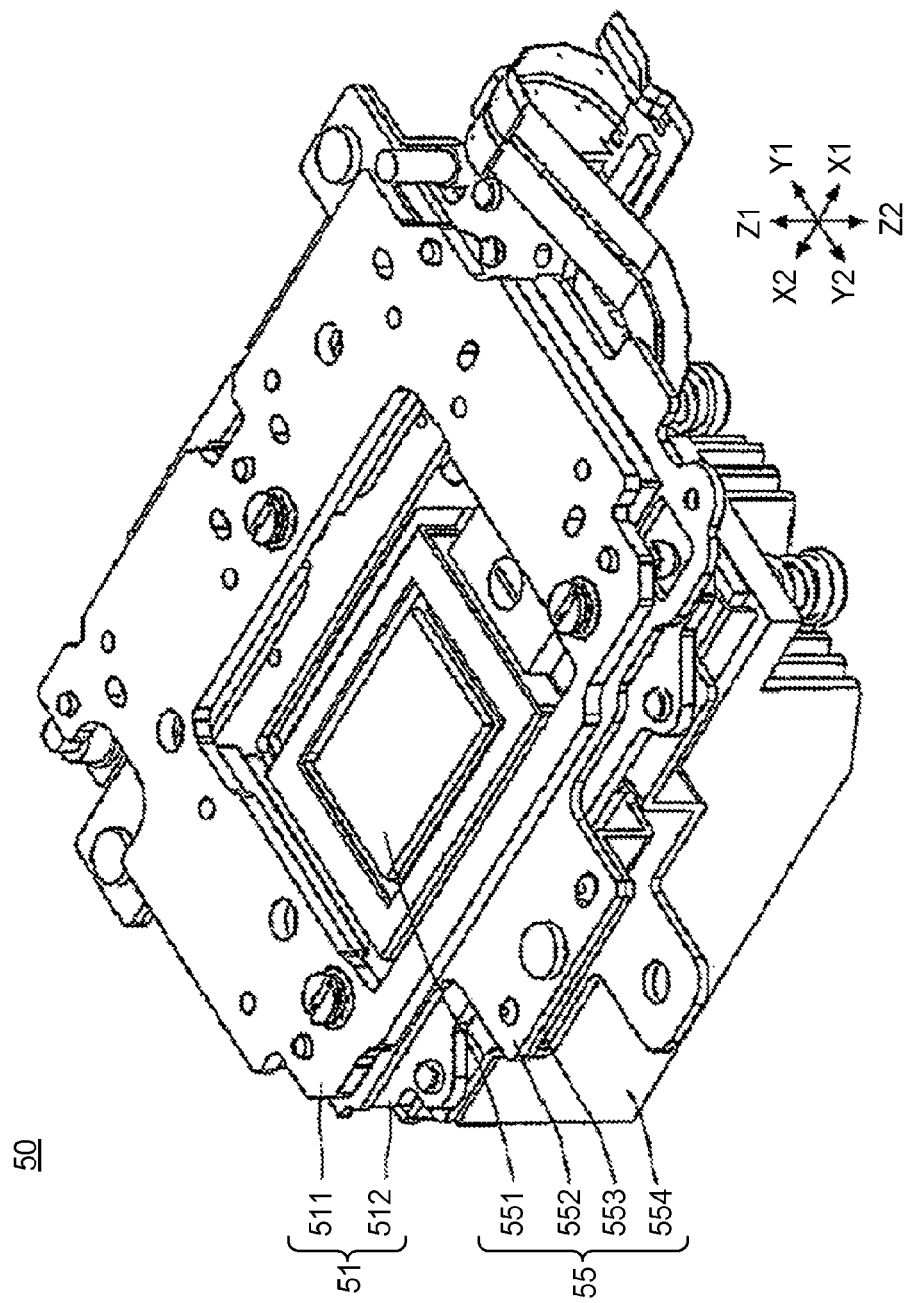
FIG. 6 is a perspective view of an image display unit according to the embodiment.
Figure 7:
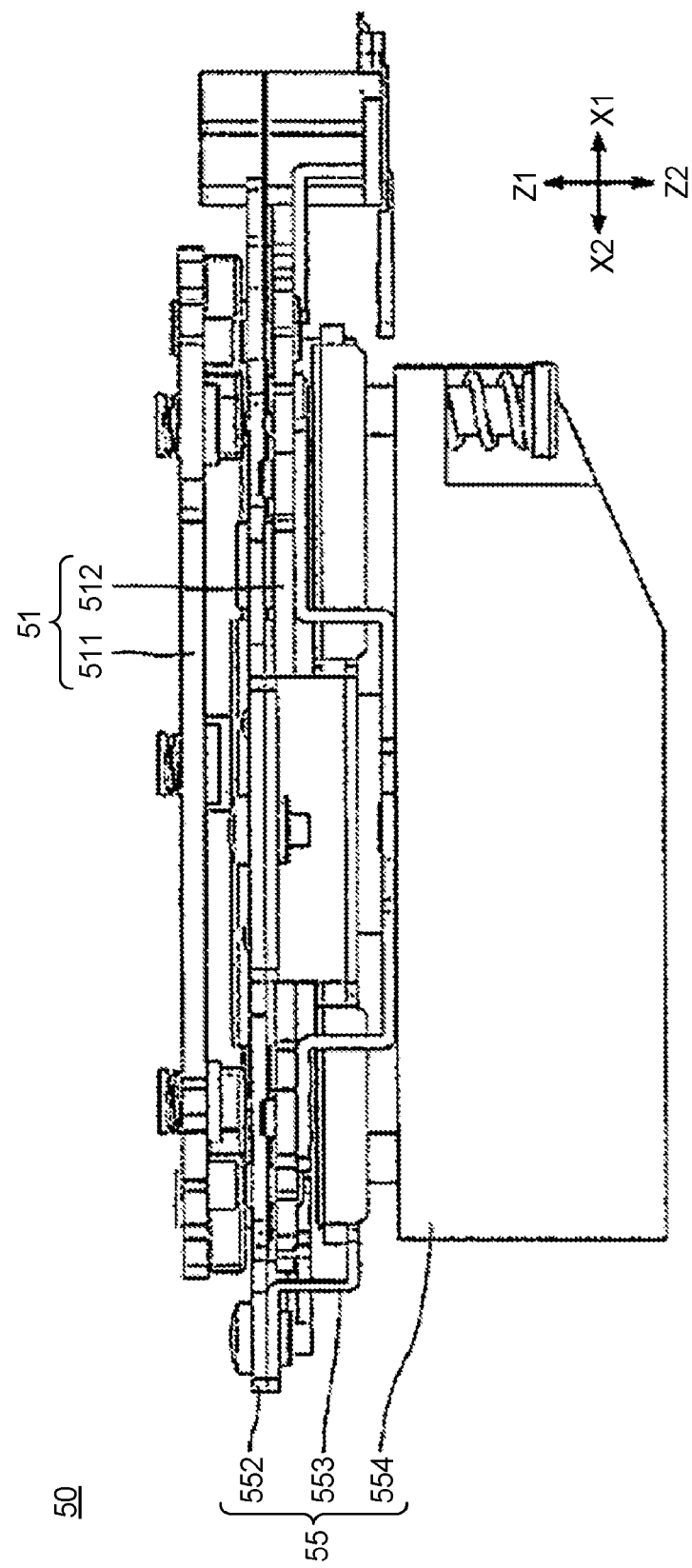
FIG. 7 is a side view of the image display unit according to the embodiment.

FIG. 6 is a perspective view of the image display unit 50 according to the embodiment. FIG. 7 is a side view of the image display unit 50 according to the embodiment.

As illustrated in FIG. 6 and FIG. 7, the image display unit 50 includes the fixed unit 51 fixedly supported and the movable unit 55 provided movably with respect to the fixed unit 51.

The fixed unit 51 includes a top plate 511 as a first fixed plate and a base plate 512 as a second fixed plate. The fixed unit 51, in which the top plate 511 and the base plate 512 are provided in parallel to each other with a predetermined space therebetween, is fixed under the illumination optical system unit 40.

The movable unit 55 includes the DMD 551, a movable plate 552 as a first movable plate, a coupling plate 553 as a second movable plate, and a heat sink 554, and is movably supported by the fixed unit 51.

The movable plate 552 is provided between the top plate 511 and the base plate 512 of the fixed unit 51, and is supported by the fixed unit 51 in parallel to the top plate 511 and the base plate 512 and is movably supported thereby in a direction parallel to the surfaces thereof.

The coupling plate 553 is fixed to the movable plate 552 across the base plate 512 of the fixed unit 51. For the coupling plate 553, the DMD 551 is fixed to the upper side of the coupling plate 553, and the heat sink 554 is fixed to the lower side of the coupling plate 553. The coupling plate 553 is fixed to the movable plate 552, and is thereby movably supported by the fixed unit 51 together with the movable plate 552, the DMD 551, and the heat sink 554.

The DMD 551 is provided on the plane of the coupling plate 553 closer to the movable plate 552, and is provided movably together with the movable plate 552 and the coupling plate 553. The DMD 551 includes an image generation plane where a plurality of movable micromirrors are arranged in a lattice pattern. Each of the micromirrors of the DMD 551, with its mirror surface tiltably mounted around a torsion axis, is on/off-driven based on an image signal transmitted from the image control unit 11 of the system control unit 10.

For example, in the case of "ON", an inclination angle of the micromirror is controlled so as to reflect the light emitted from the light source 30 to the projection optical system unit 60. For example, in the case of "OFF", an inclination angle of the micromirror is controlled in a direction for reflecting the light emitted from the light source 30 toward an OFF light plate (not illustrated).

In this way, the DMD 551 is configured to control the inclination angle of each micromirror by the image signal transmitted from the image control unit 11 and modulate the light emitted from the light source 30 and passing through the illumination optical system unit 40 to generate a projection image.

The heat sink 554 is an example of a heat radiating unit, and is provided such that at least part of the heat sink is in contact with the DMD 551. The heat sink 554 is provided in the movably supported coupling plate 553 together with the DMD 551, such that the heat sink 554 is in contact with the DMD 551, which enables the DMD 551 to be efficiently cooled. Based on this configuration, in the projector 1 according to the present embodiment, the heat sink 554 suppresses an increase in the temperature of the DMD 551, so that occurrence of troubles such as a malfunction or a failure due to the increase in the temperature of the DMD 551 can be reduced.

Fixed Unit

Figure 8:
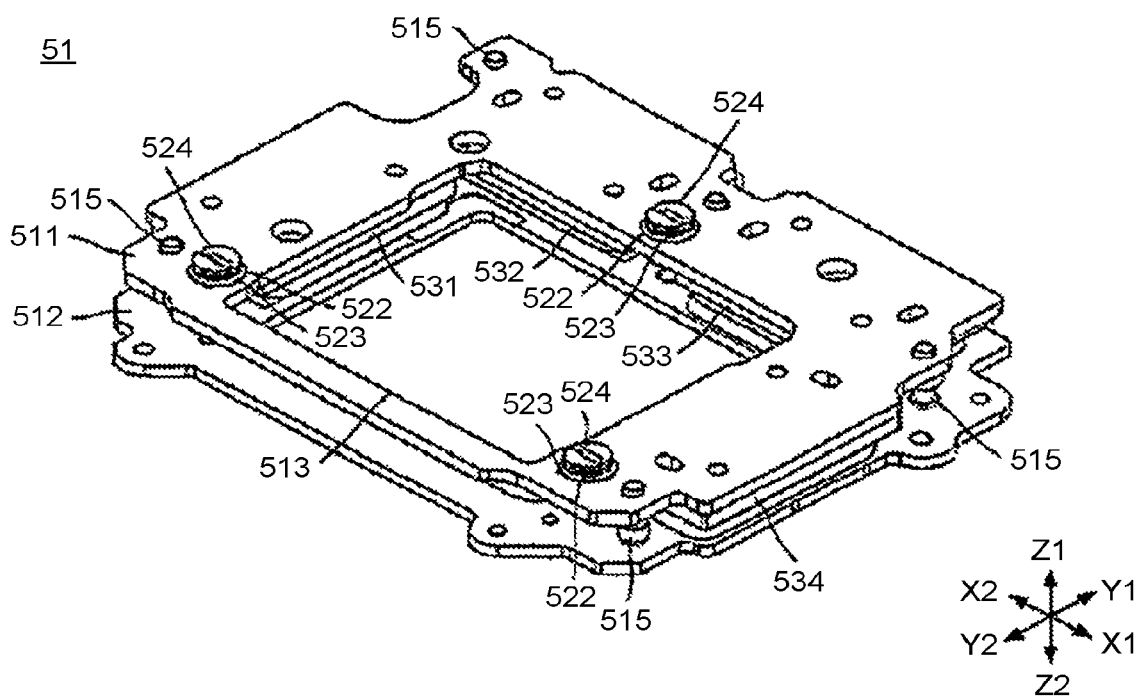
FIG. 8 is a perspective view of a fixed unit according to the embodiment.
Figure 9:
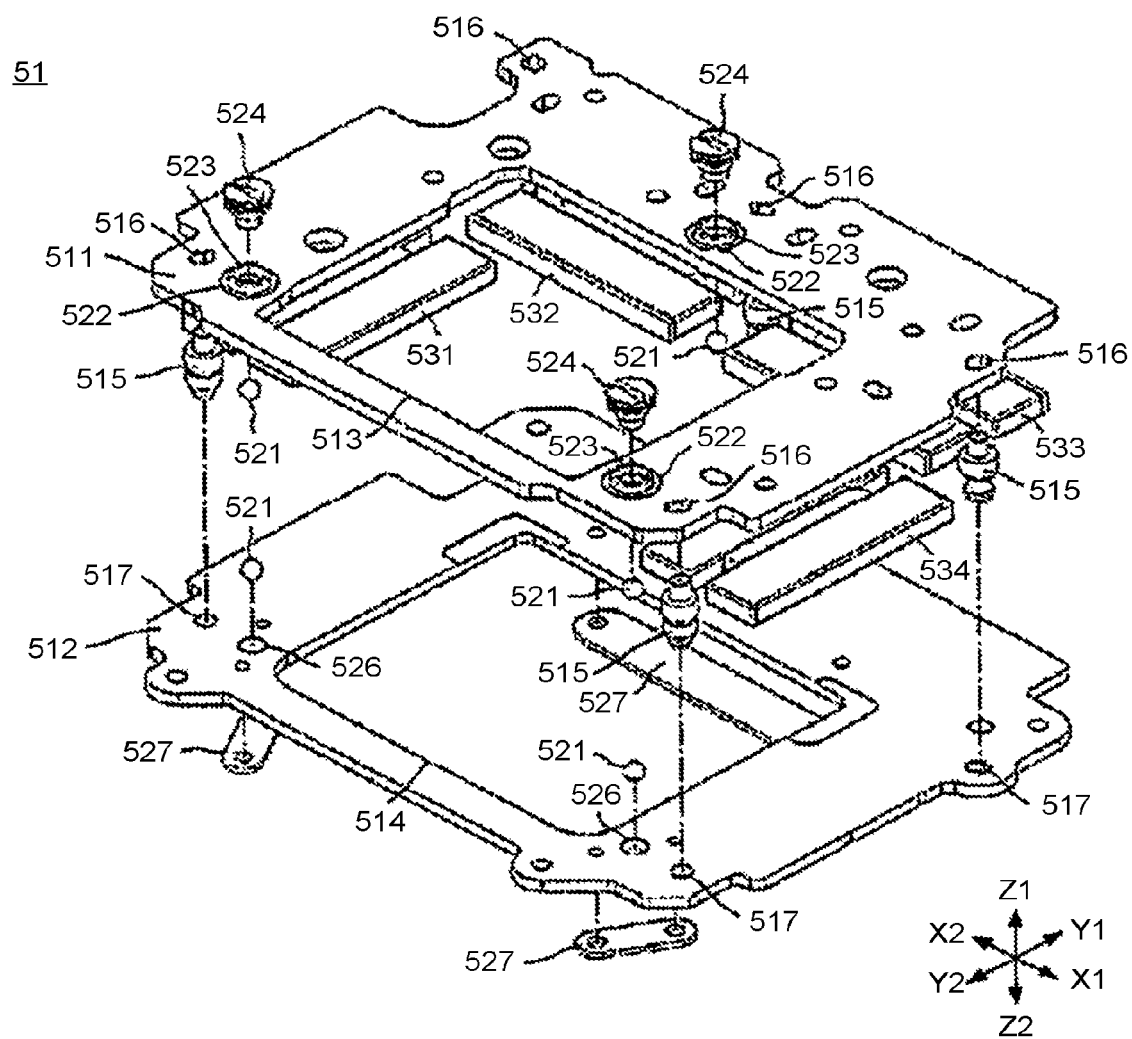
FIG. 9 is an exploded perspective view of the fixed unit according to the embodiment.

FIG. 8 is a perspective view of the fixed unit 51 according to the embodiment. FIG. 9 is an exploded perspective view of the fixed unit 51 according to the embodiment.

As illustrated in FIG. 8 and FIG. 9, the fixed unit 51 includes the top plate 511 and the base plate 512.

The top plate 511 and the base plate 512 are each formed from a plate member, and have central holes 513 and 514 respectively provided at positions corresponding to the DMD 551 of the movable unit 55. The top plate 511 and the base plate 512 are provided in parallel to each other by a plurality of supports 515 with a predetermined space therebetween.

As illustrated in FIG. 9, an upper end of the support 515 is pressed into a supporting hole 516 formed in the top plate 511, and a lower end thereof where a male screw groove is formed is inserted into a supporting hole 517 formed in the base plate 512. The supports 515 form a given space between the top plate 511 and the base plate 512 and support the top plate 511 and the base plate 512 in a parallel manner.

A plurality of supporting holes 522 and 526 each of which rotatably holds a supporting sphere 521 are formed in the top plate 511 and the base plate 512, respectively.

A cylindrical holding member 523 having a female screw groove in its inner periphery is inserted into the supporting hole 522 of the top plate 511. The holding member 523 rotatably holds the supporting sphere 521, and a position adjustment screw 524 is inserted into the holding member 523 from above. The supporting hole 526 of the base plate 512 is covered at its lower end by a lid member 527 and rotatably holds the supporting sphere 521.

The supporting spheres 521 rotatably held by the respective supporting holes 522 and 526 of the top plate 511 and the base plate 512 are in contact with the movable plate 552 provided between the top plate 511 and the base plate 512 to movably support the movable plate 552.

Figure 10:
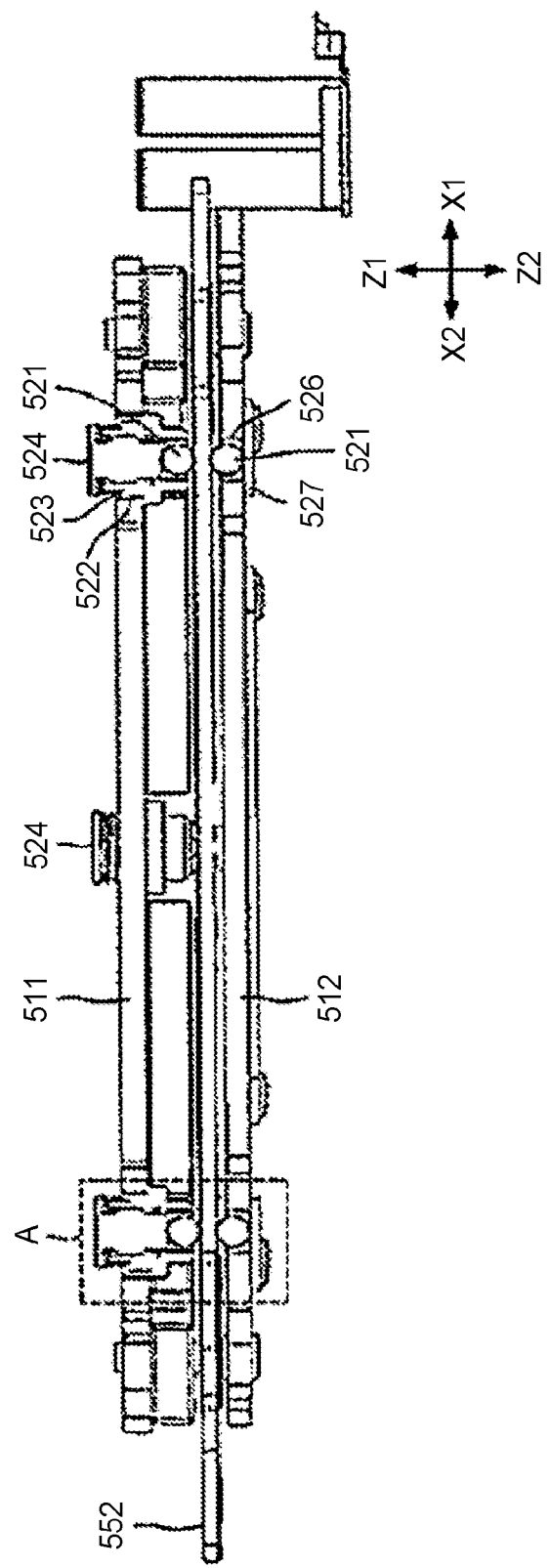
FIG. 10 is a diagram for explaining a support structure of a movable plate using the fixed unit according to the embodiment.
Figure 11:
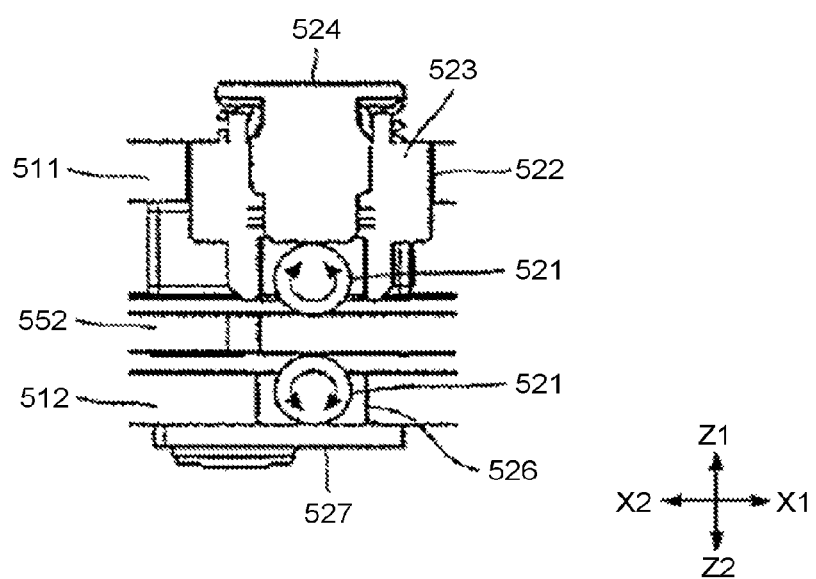
FIG. 11 is a partially enlarged view for explaining the support structure of the movable plate using the fixed unit according to the embodiment.

FIG. 10 is a diagram for explaining a support structure of the movable plate 552 using the fixed unit 51 according to the embodiment. FIG. 11 is a partially enlarged view of an outline structure of part A illustrated in FIG. 10.

As illustrated in FIG. 10 and FIG. 11, in the top plate 511, the supporting sphere 521 is rotatably held by the holding member 523 inserted into the supporting hole 522. In the base plate 512, the supporting sphere 521 is also rotatably held by the supporting hole 526 whose lower end is covered by the lid member 527.

The supporting spheres 521 are held such that at least part thereof protrudes from the supporting holes 522 and 526, and are in contact with and support the movable plate 552 provided between the top plate 511 and the base plate 512. The movable plate 552 is supported by the rotatably provided supporting spheres 521 from both sides so as to be supported in parallel to the top plate 511 and the base plate 512 and movably in a direction parallel to the surfaces thereof.

In the supporting sphere 521 provided on the top plate 511, an amount of protrusion from the lower end of the holding member 523 is changed according to the position of the position adjustment screw 524 in contact with the supporting sphere 521 at the side of the supporting sphere 521 further from the movable plate 552. For example, when the position adjustment screw 524 is displaced in the Z1 direction, the amount of protrusion of the supporting sphere 521 decreases, so that a space between the top plate 511 and the movable plate 552 is reduced. Also, for example, when the position adjustment screw 524 is displaced in the Z2 direction, the amount of protrusion of the supporting sphere 521 increases, so that a space between the top plate 511 and the movable plate 552 is increased.

In this way, by changing the amount of protrusion of the supporting sphere 521 using the position adjustment screw 524, the space between the top plate 511 and the movable plate 552 can be appropriately adjusted.

As illustrated in FIG. 8 and FIG. 9, magnets 531, 532, 533, and 534 are provided on the plane of the top plate 511 closer to the base plate 512.

Figure 12:
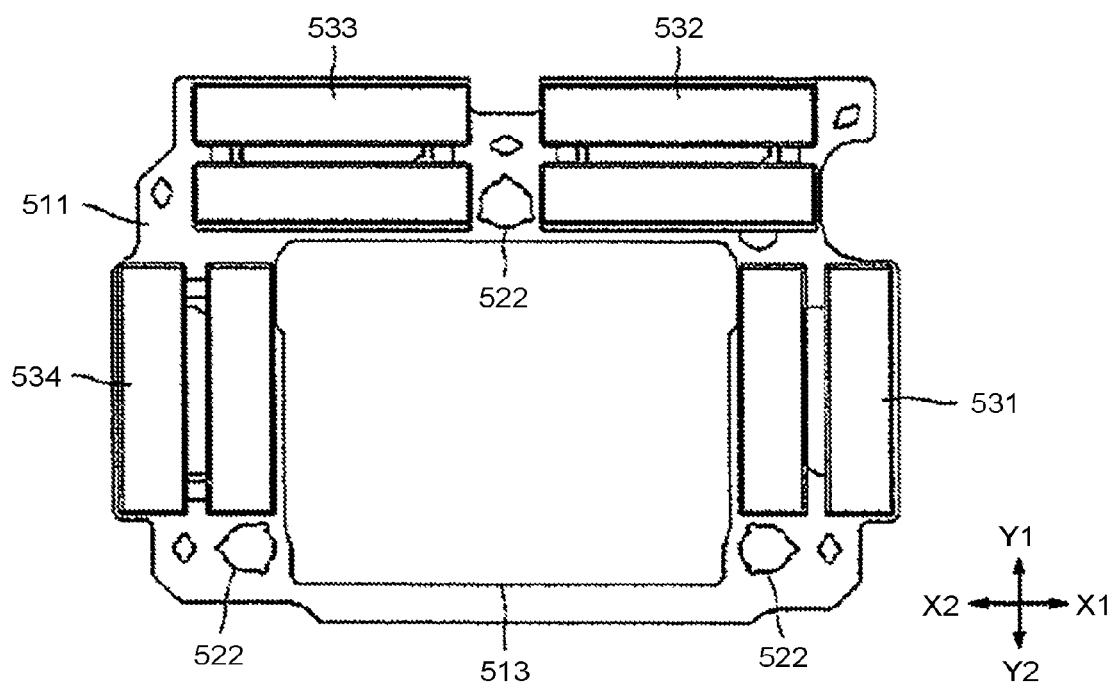
FIG. 12 is a bottom view of a top cover according to the embodiment.

FIG. 12 is a bottom view of the top plate 511 according to the embodiment. As illustrated in FIG. 12, the magnets 531, 532, 533, and 534 are provided on the plane of the top plate 511 closer to the base plate 512.

The magnets 531, 532, 533, and 534 are arranged in four locations so as to surround the central hole 513 of the top plate 511. Each of the magnets 531, 532, 533, and 534 is configured with two cuboid magnets arranged such that their longitudinal directions are parallel to each other, and the two magnets form a magnetic field affecting the movable plate 552.

The magnets 531, 532, 533, and 534 constitute a moving unit for moving the movable plate 552 in cooperation with coils that are provided in the upper surface of the movable plate 552 so as to face the magnets 531, 532, 533, and 534.

The number, the locations, and the like of the supports 515 and the supporting spheres 521 provided in the fixed unit 51 are not limited to the configuration illustrated in the present embodiment as long as they are capable of movably supporting the movable plate 552.

Movable Unit

Figure 13:
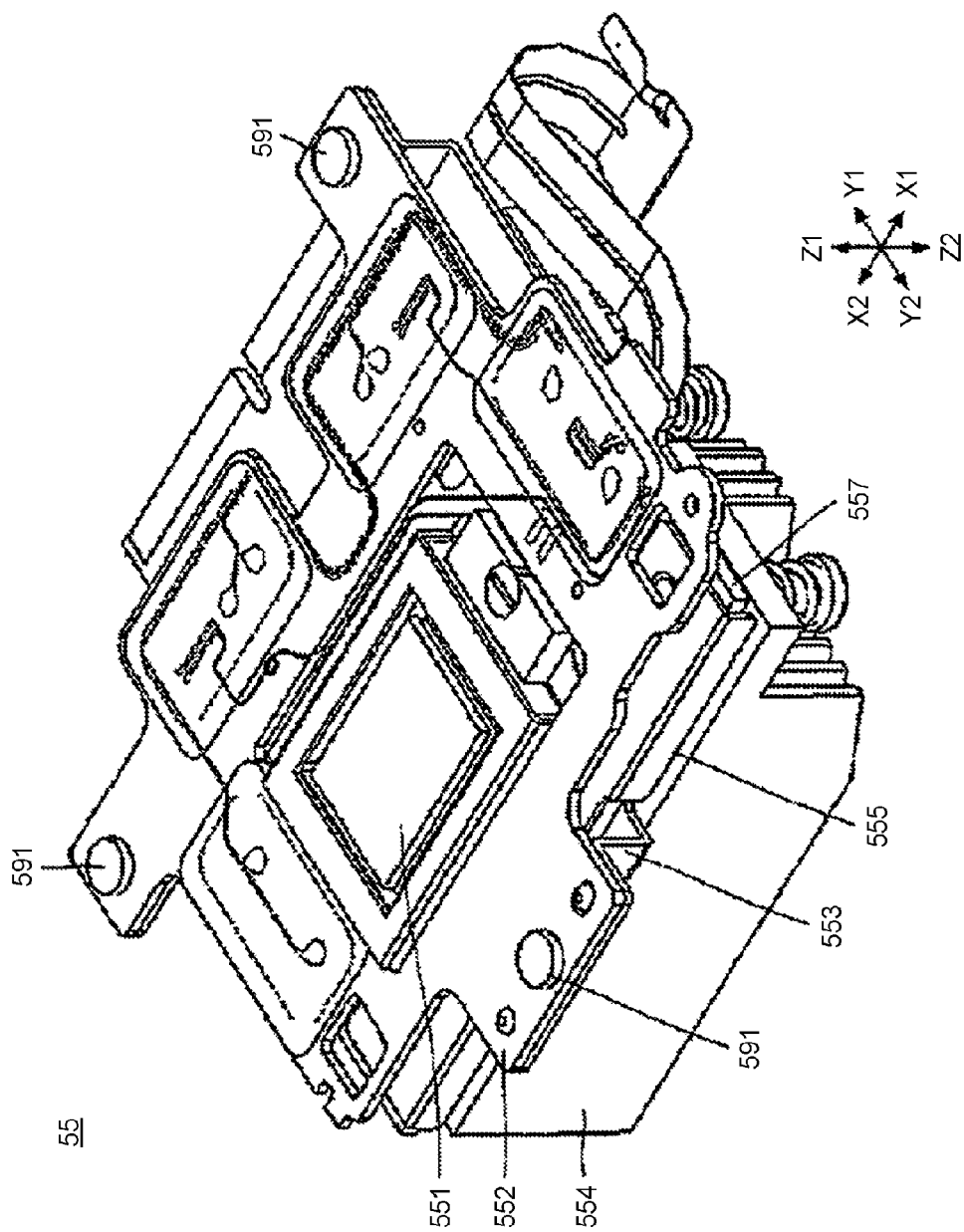
FIG. 13 is a perspective view of a movable unit according to the embodiment.
Figure 14:
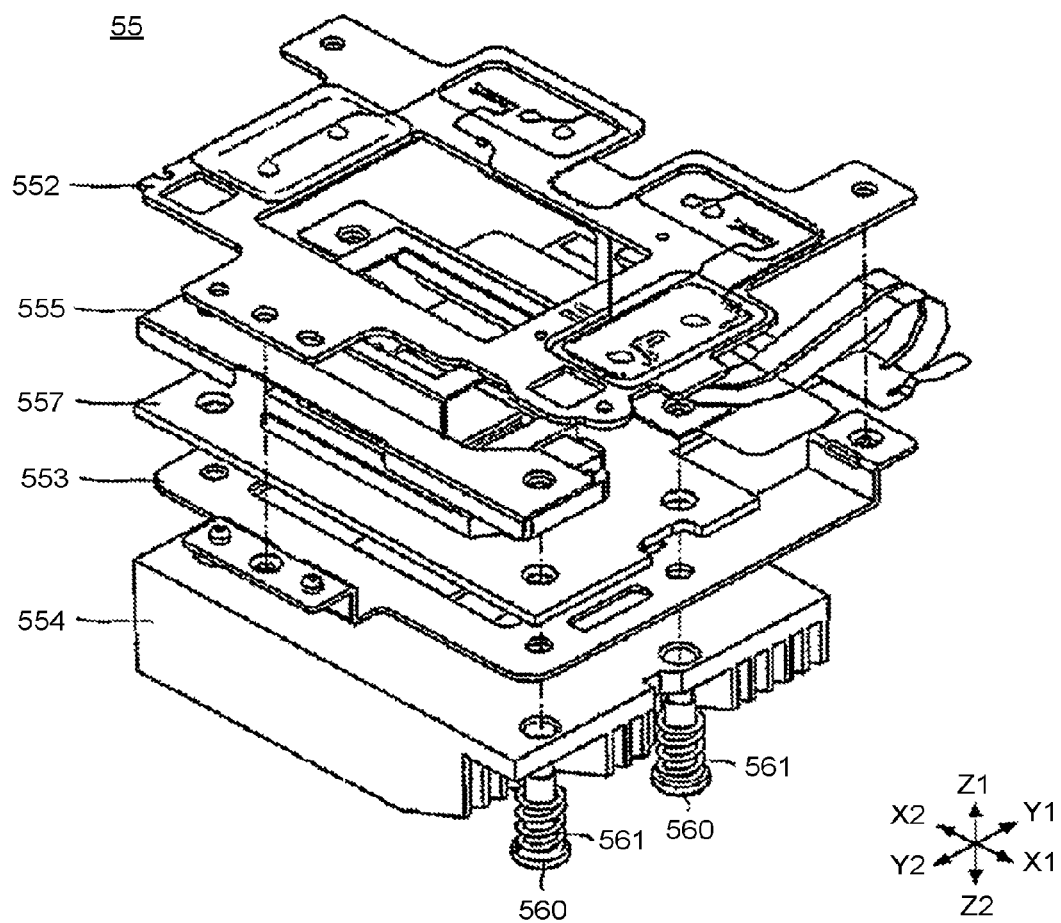
FIG. 14 is an exploded perspective view of the movable unit according to the embodiment.

FIG. 13 is a perspective view of the movable unit 55 according to the embodiment. FIG. 14 is an exploded perspective view of the movable unit 55 according to the embodiment.

As illustrated in FIG. 13 and FIG. 14, the movable unit 55 includes the DMD 551, the movable plate 552, the coupling plate 553, the heat sink 554, a holding member 555, and a DMD substrate 557, and is supported movably with respect to the fixed unit 51.

As explanation above, the movable plate 552 is provided between the top plate 511 and the base plate 512 of the fixed unit 51, and is supported movably in a direction parallel to the surfaces by the supporting spheres 521.

Figure 15:
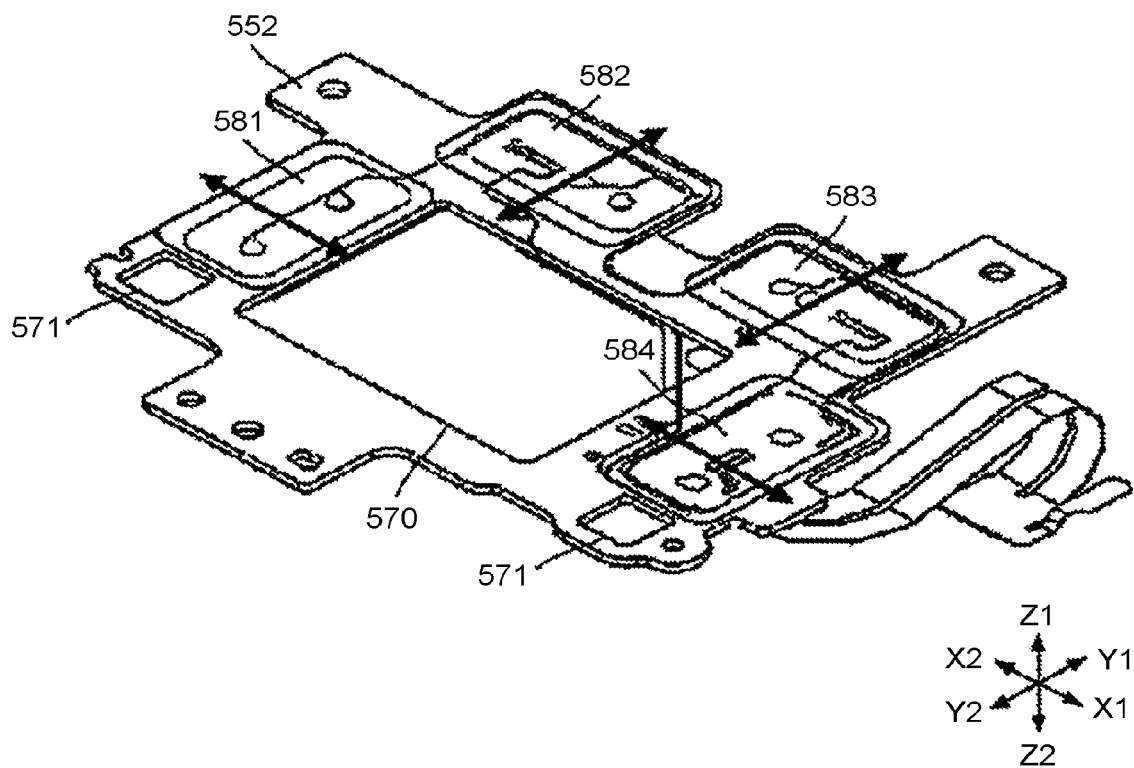
FIG. 15 is a perspective view of the movable plate according to the embodiment.

FIG. 15 is a perspective view of the movable plate 552 according to the embodiment.

As illustrated in FIG. 15, the movable plate 552 is formed from a plate member, has a central hole 570 made at a position corresponding to the DMD 551 provided in the DMD substrate 557, and also has coils 581, 582, 583, and 584 provided around the central hole 570.

Each of the coils 581, 582, 583, and 584 is formed by an electric wire being wound around an axis parallel to the Z1Z2 direction, is provided in a recess formed in the side of the movable plate 552 closer to the top plate 511, and is covered with a cover. The coils 581, 582, 583, and 584 constitute the moving unit for moving the movable plate 552 in cooperation with the respective magnets 531, 532, 533, and 534 of the top plate 511.

The magnets 531, 532, 533, and 534 of the top plate 511 and the coils 581, 582, 583, and 584 of the movable plate 552 are provided in locations so as to face each other, respectively, in the state where the movable unit 55 is supported by the fixed unit 51. When a current is made to flow in the coils 581, 582, 583, and 584, a Lorentz force as a drive force for moving the movable plate 552 is generated by an electric field formed by the magnets 531, 532, 533, and 534.

The movable plate 552 receives the Lorentz force as the drive force generated between the magnets 531, 532, 533, and 534 and the coils 581, 582, 583, and 584, and is linearly or rotationally displaced on the XY plane with respect to the fixed unit 51.

The magnitude and direction of the current flowing in each of the coils 581, 582, 583, and 584 is controlled by the movement control unit 12 of the system control unit 10. The movement control unit 12 controls a movement (rotation) direction, a movement amount, a rotation angle, and/or the like of the movable plate 552 by the magnitude and direction of the current flowing in each of the coils 581, 582, 583, and 584. That is, the movement control unit 12 can perform control to move the image display unit 50 movable with respect to the illumination optical system unit 40.

In the present embodiment, as the first driving unit, the coil 581 and the magnet 531 are provided such that the coil 584 and the magnet 534 face each other in the X1X2 direction. When a current is made to flow in the coil 581 and the coil 584, a Lorentz force is generated in the X1 direction or in the X2 direction as illustrated in FIG. 15. The movable plate 552 is moved in the X1 direction or in the X2 direction by the Lorentz forces generated between the coil 581 and the magnet 531 and between the coil 584 and the magnet 534.

In the present embodiment, as the second driving unit, the coil 582 and the magnet 532 are provided in parallel to the coil 583 and the magnet 533 in the X1X2 direction, and the magnet 532 and the magnet 533 are arranged such that their longitudinal directions are perpendicular to the longitudinal directions of the magnet 531 and the magnet 534. Based on this configuration, when a current is made to flow in the coil 582 and the coil 583, a Lorentz force is generated in the Y1 direction or in the Y2 direction as illustrated in FIG. 15.

The movable plate 552 is moved in the Y1 direction or in the Y2 direction by Lorentz forces generated between the coil 582 and the magnet 532 and between the coil 583 and the magnet 533. The movable plate 552 is displaced to rotate on the XY plane by the Lorentz forces generated in the opposite directions between the coil 582 and the magnet 532 and between the coil 583 and the magnet 533.

For example, when a current is made to flow such that a Lorentz force is generated in the Y1 direction between the coil 582 and the magnet 532 and a Lorentz force is generated in the Y2 direction between the coil 583 and the magnet 533, the movable plate 552 is displaced to rotate clockwise when viewed from the top. In addition, when a current is made to flow such that a Lorentz force is generated in the Y2 direction between the coil 582 and the magnet 532 and a Lorentz force is generated in the Y1 direction between the coil 583 and the magnet 533, the movable plate 552 is displaced to rotate counterclockwise when viewed from the top.

A movable range restriction hole 571 is provided in the movable plate 552 at a position corresponding to the support 515 of the fixed unit 51. The support 515 of the fixed unit 51 is inserted in the movable range restriction hole 571 and the movable range restriction hole 571 restricts a movable range of the movable plate 552 by coming in contact with the support 515 when the movable plate 552 is largely moved due to, for example, vibration or some abnormality.

As explained above, in the present embodiment, the movement control unit 12 of the system control unit 10 controls the magnitude or the direction of the current to be made to flow in the coils 581, 582, 583, and 584, so that the movable plate 552 can be moved to an arbitrary location within the movable range.

The number, the locations, and the like of the magnets 531, 532, 533, and 534 and the coils 581, 582, 583, and 584, which function as the moving unit, may be configured in a different manner from that of the present embodiment as long as the movable plate 552 can be moved to an arbitrary location. For example, the magnets as the moving unit may be provided in the upper surface of the top plate 511 or may be provided in any plane of the base plate 512. For example, a configuration in which the magnets are provided in the movable plate 552 and the coils are provided in the top plate 511 or in the base plate 512, may be employed.

The number, the locations, the shape, and the like of the movable range restriction hole 571 are not limited to the configuration illustrated in the present embodiment. For example, the number of movable range restriction holes 571 may be one or plural. The shape of the movable range restriction hole 571 may be different from that of the present embodiment, and may be a rectangle or a circle, for example.

As illustrated in FIG. 13, the coupling plate 553 is fixed to the lower side (the side closer to the base plate 512) of the movable plate 552 movably supported by the fixed unit 51. The coupling plate 553 is formed from a plate member, has a central hole made at a position corresponding to the DMD 551, and is fixed, at bent portions provided around the coupling plate 553, to the lower side of the movable plate 552 using three screws 591.

Figure 16:
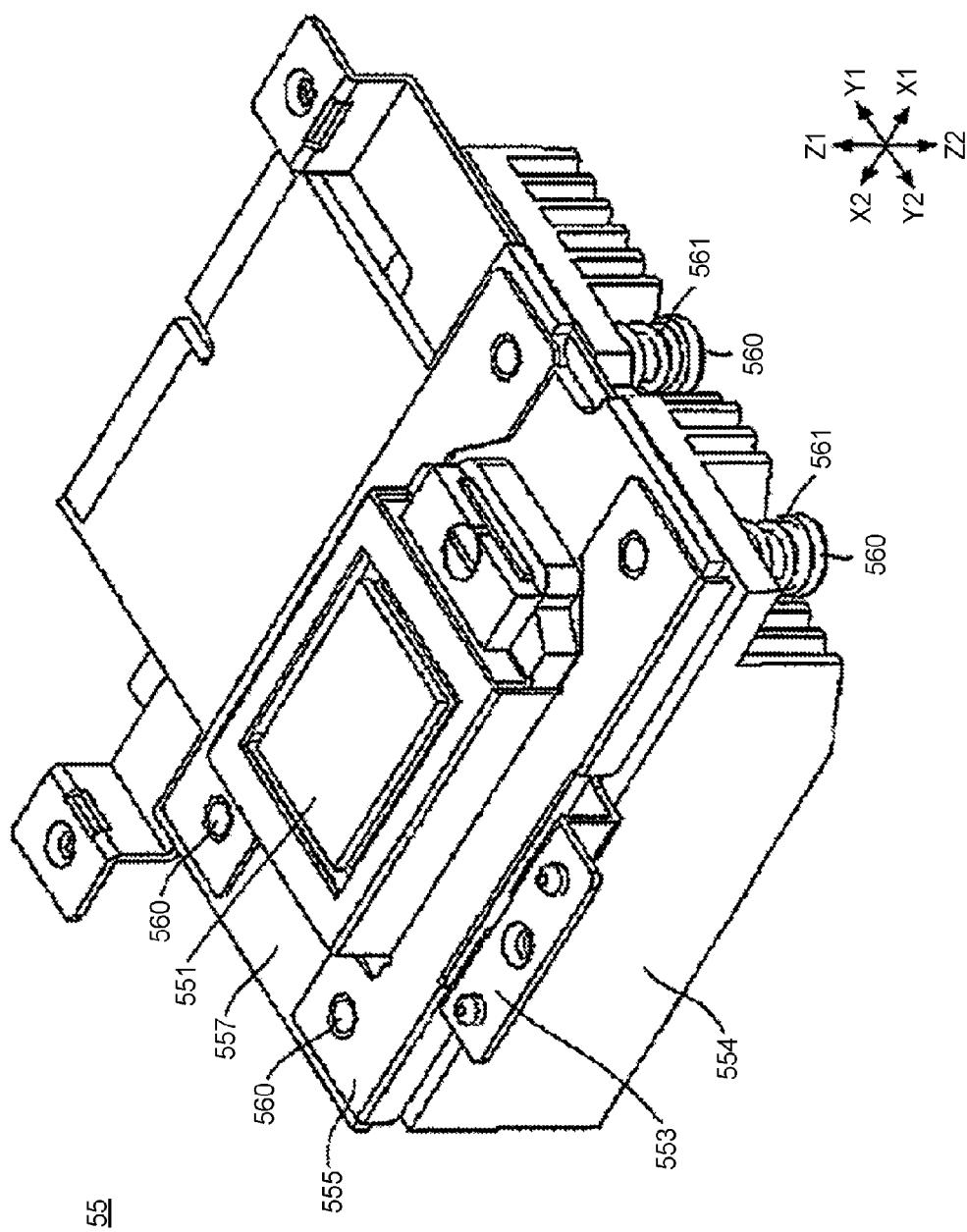
FIG. 16 is a perspective view of the movable unit from which the movable plate is removed according to the embodiment.

FIG. 16 is a perspective view of the movable unit 55 from which the movable plate 552 is removed.

As illustrated in FIG. 16, the coupling plate 553 has the DMD 551 provided on its upper surface and the heat sink 554 provided on its lower surface. The coupling plate 553 is fixed to the movable plate 552, and is thereby provided movably with respect to the fixed unit 51 in association with the movable plate 552 together with the DMD 551 and the heat sink 554.

The DMD 551 is provided in the DMD substrate 557, and the DMD substrate 557 is sandwiched between the holding member 555 and the coupling plate 553, so that the DMD 551 is fixed to the coupling plate 553. As illustrated in FIG. 14 and FIG. 16, the holding member 555, the DMD substrate 557, the coupling plate 553, and the heat sink 554 are overlapped and fixed using stepped screws 560 as fixing units and springs 561 as pressing units.

Figure 17:
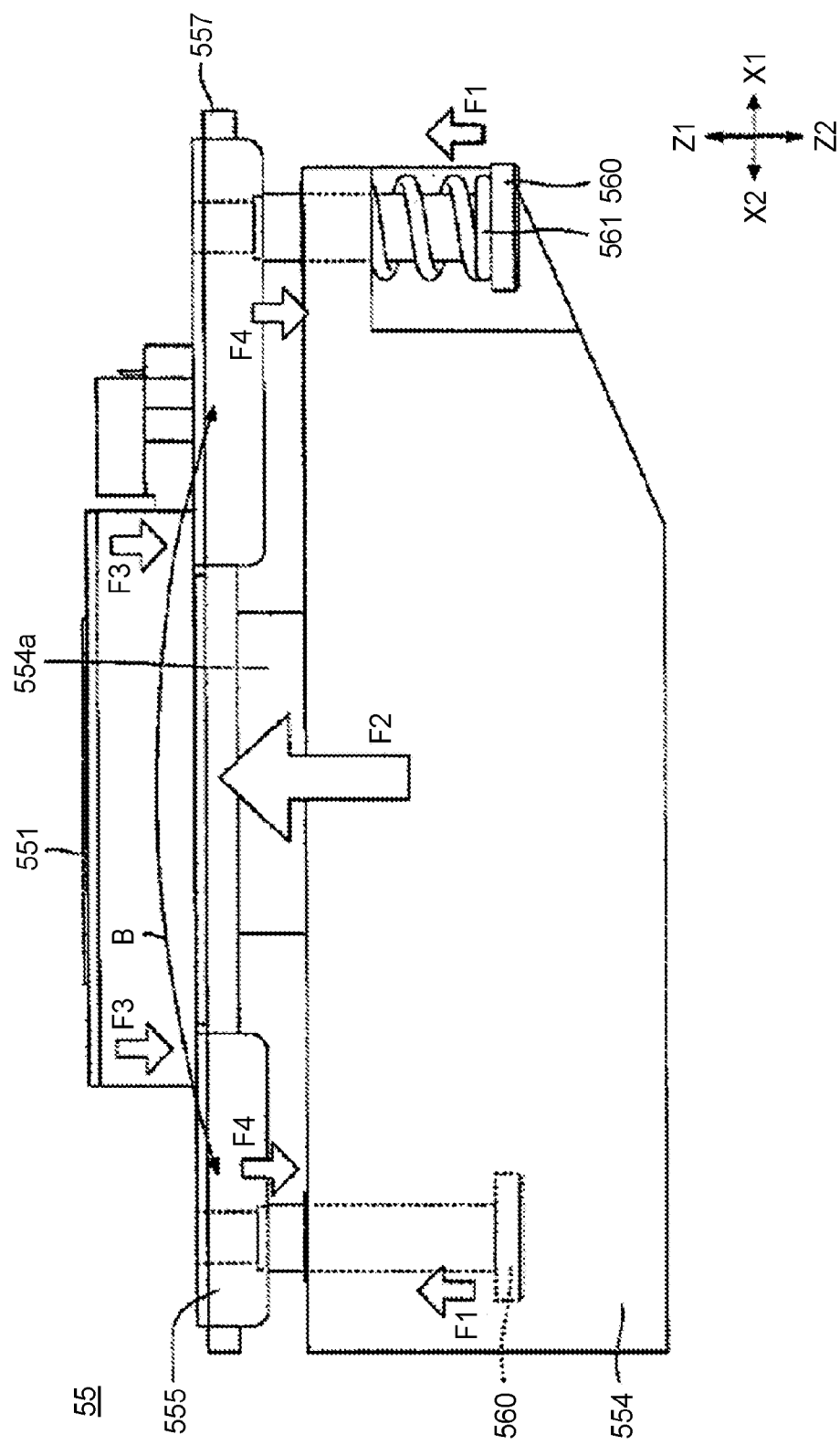
FIG. 17 is a diagram for explaining a DMD holding structure of the movable unit according to the embodiment.

FIG. 17 is a diagram for explaining a DMD holding structure of the movable unit 55 according to the embodiment. FIG. 17 is a side view of the movable unit 55, in which the movable plate 552 and the coupling plate 553 are not illustrated.

As illustrated in FIG. 17, the heat sink 554 has a projecting portion 554a in contact with the lower side of the DMD 551 through a through hole provided in the DMD substrate 557 in the state where the heat sink 554 is fixed to the coupling plate 553. The projecting portion 554a of the heat sink 554 may be provided such that it is in contact with a position of the lower side of the DMD substrate 557 corresponding to the DMD 551.

To enhance a cooling effect of the DMD 551, an elastically deformable heat transfer sheet may be provided between the projecting portion 554a of the heat sink 554 and the DMD 551. A thermal conductivity between the projecting portion 554a of the heat sink 554 and the DMD 551 is enhanced, and the cooling effect of the DMD 551 by the heat sink 554 is enhanced by the heat transfer sheet.

As explained above, the holding member 555, the DMD substrate 557, and the heat sink 554 are overlapped and fixed using the stepped screws 560 and the springs 561. When the stepped screws 560 are tightened, the springs 561 are compressed in the Z1Z2 direction, and a force F1 in the Z1 direction illustrated in FIG. 17 is generated from the spring 561. The heat sink 554 is pressed against the DMD 551 by a force F2 in the Z1 direction due to forces F1 generated from the springs 561.

In the present embodiment, the stepped screws 560 and the springs 561 are provided in four locations, and the force F2 applied to the heat sink 554 is equal to that obtained by combining the forces F1 generated in the four springs 561. The force F2 from the heat sink 554 acts on the holding member 555 that holds the DMD substrate 557 where the DMD 551 is provided. Consequently, a force F3 in the Z2 direction corresponding to the force F2 from the heat sink 554 is generated in the holding member 555, so that the DMD substrate 557 can be held between the holding member 555 and the coupling plate 553.

A force F4 in the Z2 direction acts on the stepped screw 560 and the spring 561 from the force F3 generated in the holding member 555. Because the springs 561 are provided in the four locations, the force F4 acting on each of the springs 561 is equivalent to a quarter of the force F3 generated in the holding member 555, and is resultantly balanced with the force F1.

The holding member 555 is a member capable of bending as illustrated by arrow B in FIG. 17 and is formed into a plate spring. The holding member 555 is bent by being pressed by the projecting portion 554a of the heat sink 554 and a force to push back the heat sink 554 in the Z2 direction is generated, so that it is possible to firmly keep the contact between the DMD 551 and the heat sink 554.

As explained above, in the movable unit 55, the movable plate 552 and the coupling plate 553 that includes the DMD 551 and the heat sink 554 are movably supported by the fixed unit 51. The position of the movable unit 55 is controlled by the movement control unit 12 of the system control unit 10. The heat sink 554 in contact with the DMD 551 is provided in the movable unit 55, so that occurrence of troubles such as a malfunction and a failure caused by an increase in the temperature of the DMD 551 can be prevented.

Image Projection

As explained above, in the projector 1 according to the present embodiment, the DMD 551 that generates a projection image is provided in the movable unit 55, and the position of the DMD 551, together with the movable unit 55, is controlled by the movement control unit 12 of the system control unit 10.

The movement control unit 12 controls the position of the movable unit 55 so as to move in a high speed between a plurality of positions which are apart from each other by a distance that is less than an arrangement interval of the micromirrors of the DMD 551 at, for example, a predetermined period corresponding to a frame rate at the time of image projection. At this time, the image control unit 11 transmits an image signal to the DMD 551 so as to generate a projection image shifted according to each of the positions.

For example, the movement control unit 12 reciprocates the DMD 551 at the predetermined period between a position P1 and a position P2 which are apart from each other by a distance that is less than an arrangement interval of the micromirrors of the DMD 551 in the X1X2 direction and in the Y1Y2 direction. At this time, the image control unit 11 controls the DMD 551 so as to generate the projection image shifted according to each of the positions, so that a resolution of the projection image can be made about twice the resolution of the DMD 551. In addition, by increasing the movement position of the DMD 551, the resolution of the projection image can be also made twice or more as much as that of the DMD 551.

In this way, the movement control unit 12 moves the DMD 551 together with the movable unit 55 at the predetermined period and the image control unit 11 generates the projection image according to the position of the DMD 551, and this enables the image with a resolution higher than that of the DMD 551 to be projected.

Also, in the projector 1 according to the present embodiment, the movement control unit 12 performs control to rotate the DMD 551 together with the movable unit 55, so that the projection image can be rotated without being reduced. For example, in a projector in which an image generating unit such as the DMD 551 is fixed, a projection image cannot be rotated while maintaining an aspect ratio of the projection image unless it is reduced. On the other hand, in the projector 1 according to the present embodiment, the DMD 551 can be rotated, and therefore the projection image can be rotated and the tilt or the like can be adjusted without reducing the projection image.

As explained above, in the projector 1 according to the present embodiment, the DMD 551 is configured to be movable, and this allows high resolution of the projection image. The heat sink 554 that cools the DMD 551 is incorporated in the movable unit 55 together with the DMD 551, which enables efficient cooling by being brought into contact with the DMD 551, and an increase in the temperature of the DMD 551 is thereby suppressed. Therefore, in the projector 1, the troubles such as a malfunction and a failure caused by the increase in the temperature of the DMD 551 are reduced.

Movement Control of Illumination Area

In the present embodiment, the illumination area control unit 13 of the system control unit 10 performs control to move an illumination area indicating an area illuminated with the light guided to the image display unit 50 by the illumination optical system unit 40, according to the movement amount of the image display unit 50. More specifically, the illumination area control unit 13 performs control to move the illumination area so that the illumination area after the movement corresponds to the DMD 551 in the image display unit 50 after the movement. Thereby it is not necessary to set the size of the illumination area to the size corresponding to the whole area of the range where the DMD 551 can move (the size equivalent to the DMD 551 is sufficient), and it can be suppressed that any area (which does not originally require illumination) other than the DMD 551 is irradiated with the illumination light. Therefore, according to the present embodiment, it is possible to improve an illumination efficiency of the illumination light irradiated to the DMD 551.

In this example, the illumination area control unit 13 performs control to move the light tunnel 402 according to the movement amount of the image display unit 50. More specifically, the illumination area control unit 13 performs control to move the light tunnel 402 by a value obtained by multiplying the movement amount of the image display unit 50 by the inverse of the enlargement factor E indicating a magnification at which the image display unit 50 magnifies the light emitted from the light source 30. In this example, the illumination area control unit 13 controls the first actuator 410 or the second actuator 411 such that the light tunnel 402 is moved according to the movement amount of the image display unit 50. As explained above, the present embodiment is configured to arrange the two actuators (410, 411) so as to move the light tunnel 402 in two orthogonal directions in order to correspond to the two-dimensional plane as the reflective surface (surface irradiated with the illumination light) of the DMD 551.

For example, the illumination area control unit 13 acquires a control signal to control the movement direction, the movement amount, and/or the like of the movable plate 552 from the movement control unit 12, detects the movement amount and the movement direction of the DMD 551 (image display unit 50) from the acquired control signal, and calculates a movement amount and a movement direction of the light tunnel 402 required for the illumination area after the movement to correspond to the DMD 551 after the movement. The illumination area control unit 13 controls the first actuator 410 or the second actuator 411 such that the light tunnel 402 is moved by the calculated movement amount in the calculated movement direction. For example, when the image display unit 50 moves in the direction corresponding to an upward direction (Z1 direction in the example of FIG. 4) of the light tunnel 402 by p, the illumination area control unit 13 controls the first actuator 410 such that the light tunnel 402 moves upward by p×1/E. Also, for example, when the image display unit 50 moves in the direction corresponding to a leftward direction (Y2 direction in the example of FIG. 4) of the light tunnel 402 by q, the illumination area control unit 13 controls the second actuator 411 such that the light tunnel 402 moves leftward by q×1/E.

As explained above, according to the present embodiment, it is possible to uniformly illuminate the DMD 551 without reducing the illumination efficiency even if the DMD 551 is moved, and this enables movement of the DMD 551 (i.e. movement of the projection position) without causing the brightness to be reduced when a comparison is made using the same lamp input.

Although the embodiment of the present invention has been explained so far, the embodiment is presented only as an example, and therefore it is not intended to limit the scope of the invention. The present invention is not limited to the embodiment without any change, and in its implementation phase, it can be embodied by modifying a component within a scope that does not depart from the gist of the present invention. Moreover, various types of invention can be formed by an appropriate combination of a plurality of components disclosed in the embodiment. For example, some components may be omitted from all the components represented in the embodiment.

Illumination Optical System Unit

Figure 18:
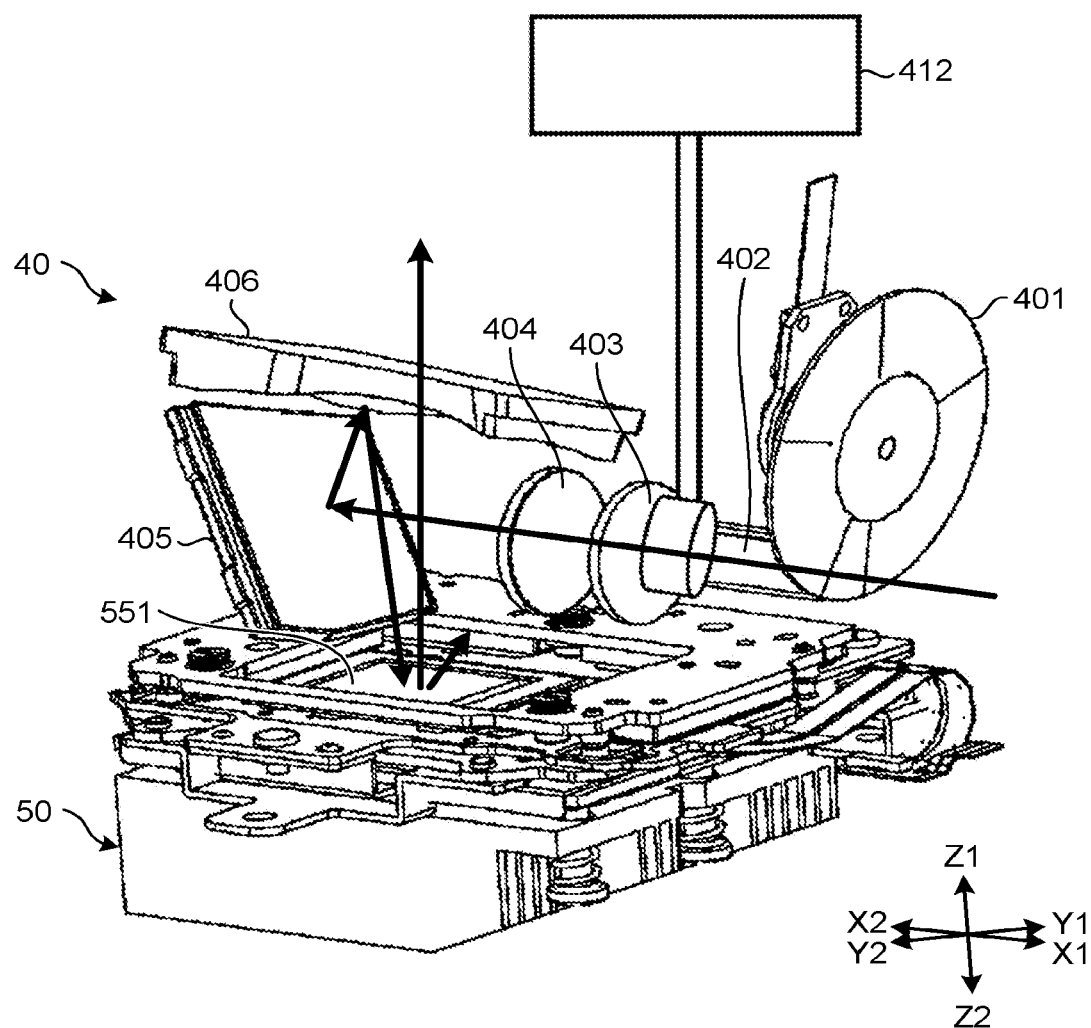
FIG. 18 is a diagram of an illumination optical system unit according to a second embodiment.

FIG. 18 is a diagram of the illumination optical system unit 40 according to a second embodiment.

As illustrated in FIG. 18, the illumination optical system unit 40 includes the color wheel 401, the light tunnel 402, the relay lenses 403 and 404, the cylinder mirror 405, and the concave mirror 406. The illumination optical system unit 40 also includes an actuator 412, as an example of the driving unit, for rotating the light tunnel 402. The actuator 412 is controlled by the illumination area control unit 13 of the system control unit 10. Specific content of the control (rotation control of the illumination area) by the illumination area control unit 13 is explained later.

The color wheel 401 is a disk in which the filters of the colors of R (Red), G (Green), and B (Blue) are arranged in different portions in, for example, the circumferential direction. The color wheel 401 is made to rotate in a high speed to thereby divide the light emitted from the light source 30 into the RGB colors in the time division manner.

The light tunnel 402 is an example of the first optical element, which is a cylindrical optical component for making uniform a brightness distribution of the light emitted from the light source 30. More specifically, the light tunnel 402 is a square tubular optical component in which sheet glass is bonded to its inner surface. The light tunnel 402 causes multiple reflections of the RGB color lights passing through the color wheel 401 on its inner surface to make the brightness distribution uniform and guide the light to the relay lenses 403 and 404.

The relay lenses 403 and 404 are examples of the second optical element, and converge the light emitted from the light tunnel 402 while correcting a longitudinal chromatic aberration of the light.

The cylinder mirror 405 and the concave mirror 406 are examples of the third optical element, and reflect the light emitted from the relay lenses 403 and 404 to the DMD 551 provided in the image display unit 50. The DMD 551 modulates the reflected light from the concave mirror 406 to generate a projection image.

Rotation Control of Illumination Area

In the present embodiment, the illumination area control unit 13 of the system control unit 10 performs control to rotate the illumination area indicating an area illuminated with the light guided to the image display unit 50 by the illumination optical system unit 40, according to a rotation amount of the image display unit 50. More specifically, the illumination area control unit 13 performs control to rotate the illumination area such that the illumination area after the rotation corresponds to the DMD 551 in the image display unit 50 after the rotation. Thereby it is not necessary to set the size of the illumination area to the size corresponding to the whole area of the range where the DMD 551 can rotate (the size equivalent to the DMD 551 is sufficient), and it can be suppressed that any area (which does not originally require illumination) other than the DMD 551 is irradiated with the illumination light. Therefore, according to the present embodiment, it is possible to improve the illumination efficiency of the illumination light irradiated to the DMD 551.

In this example, the illumination area control unit 13 performs control to rotate the light tunnel 402 according to the rotation amount of the image display unit 50. More specifically, the illumination area control unit 13 performs control to rotate the light tunnel 402 by a rotation amount the same as the rotation amount of the image display unit 50.

In this example, the illumination area control unit 13 controls the actuator 412 such that the light tunnel 402 is rotated according to the rotation amount of the image display unit 50. For example, the illumination area control unit 13 acquires a control signal to control a rotation direction, a rotation angle, and/or the like of the movable plate 552 from the movement control unit 12, detects the rotation amount and the rotation direction of the DMD 551 (image display unit 50) from the acquired control signal, and calculates the rotation amount and the rotation direction of the light tunnel 402 required for the illumination area after the rotation to correspond to the DMD 551 after the rotation (in this example, the rotation amount and the rotation direction are the same as the rotation amount and the rotation direction of the image display unit 50). The illumination area control unit 13 then controls the actuator 412 so that the light tunnel 402 is rotated by the calculated rotation amount in the calculated rotation direction. The actuator 412 is configured to rotate the light tunnel 402 about the center axis of a rectangular space of the light tunnel 402 as a rotation axis in order to respond to an operation of rotation about the center of the DMD 551 as a rotation axis.

As explained above, according to the present embodiment, it is possible to uniformly illuminate the DMD 551 without reducing the illumination efficiency even if the DMD 551 is rotated, and this enables rotation of the DMD 551 (i.e. rotation of a projection attitude) without causing the brightness to be reduced when a comparison is made using the same lamp input.

According to an embodiment, it is possible to improve the illumination efficiency of an illumination light irradiated to the optical modulation element.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection device, comprising:
   an image generating unit that includes a digital micromirror device (DMD) to generate an image using light emitted from a light source;
   an illumination optical unit that includes one or more optical elements to guide the light emitted from the light source to the image generating unit, the one or more optical elements including a light tunnel;
   a projector configured to project the generated image; and
   circuitry configured to perform control to move the image generating unit with respect to the illumination optical unit, and perform control to move an illumination area indicating an area illuminated with the guided light according to a movement amount of the image generating unit, wherein the circuitry is further configured to calculate a movement amount of the light tunnel and control movement of the light tunnel by the calculated movement amount using a control signal, based on the movement amount of the image generating unit.

2. The image projection device according to claim 1, wherein the circuitry is further configured to perform control to move the illumination area such that the illumination area after the movement corresponds to the DMD after the movement.

3. The image projection device according to claim 1, wherein the one or more optical elements include
   a first optical element which is the light tunnel, the light tunnel being a cylindrical optical component making uniform a brightness distribution of the light emitted from the light source,
   a second optical element that converges the light emitted from the first optical element while correcting a longitudinal chromatic aberration of the light, and
   a third optical element that reflects the light emitted from the second optical element to the image generating unit, and the circuitry is further configured to perform control to move the first optical element according to the movement amount of the image generating unit.

4. The image projection device according to claim 3, wherein the circuitry is further configured to perform control to move the first optical element by a value obtained by multiplying the movement amount of the image generating unit by an inverse of an enlargement factor indicating a magnification at which the illumination optical unit magnifies the light emitted from the light source.

5. The image projection device according to claim 3, further comprising:
  a first actuator to move the first optical element in a first direction; and
  a second actuator to move the first optical element in a second direction perpendicular to the first direction, wherein
  the circuitry is further configured to control the first actuator or the second actuator such that the first optical element is moved according to the movement amount of the image generating unit.

6. The image projection device according to claim 5, wherein each of the first actuator and the second actuator includes a coil and a magnet.

7. The image projection device according to claim 4, wherein the first optical element is a square tubular optical component in which sheet glass is bonded to its inner surface.

8. An image projection method performed by an image projection device that includes an image generating unit that includes a digital micromirror device (DMD) to generate an image using light emitted from a light source, an illumination optical unit that includes one or more optical elements to guide the light emitted from the light source to the image generating unit, the one or more optical elements including a light tunnel, and a projector configured to project the image generated by the image generating unit, the image projection method comprising:
  first performing control to move the image generating unit with respect to the illumination optical unit; and
  second performing control to move an illumination area indicating an area illuminated with the guided light according to a movement amount of the image generating unit, wherein the second performing step includes calculating a movement amount of the light tunnel and controlling movement of the light tunnel by the calculated movement amount using a control signal, based on the movement amount of the image generating unit.

9. An image projection device, comprising:
  an image generating unit that includes a digital micromirror (DMD) to generate an image using light emitted from a light source;
  an illumination optical unit that includes one or more optical elements to guide the light emitted from the light source to the image generating unit, the one or more optical elements including a light tunnel;
  a projector configured to project the generated image; and
  circuitry configured to perform control to rotate the image generating unit with respect to the illumination optical unit, and perform control to rotate an illumination area indicating an area illuminated with the guided light according to a rotation amount of the image generating unit, wherein the circuitry is further configured to calculate a rotation amount of the light tunnel and control rotation of the light tunnel by the calculated rotation amount using a control signal, based on the rotation amount of the image generating unit.

10. The image projection device according to claim 9, wherein the circuitry is further configured to perform control to rotate the illumination area such that the illumination area after the rotation corresponds to the DMD after the rotation.

11. An image projection method performed by an image projection device that includes an image generating unit that includes a digital micromirror device (DMD) generating an image using light emitted from a light source, an illumination optical unit that includes one or more optical elements guiding the light emitted from the light source to the image generating unit, the one or more optical elements including a light tunnel, and a projector configured to project the image generated by the image generating unit, the image projection method comprising:
  first performing control to rotate the image generating unit with respect to the illumination optical unit; and
  second performing control to rotate an illumination area indicating an area illuminated with the guided light according to a rotation amount of the image generating unit, wherein the second performing step includes calculating a rotation amount of the light tunnel and controlling rotation of the light tunnel by the calculated rotation amount using a control signal, based on the rotation amount of the image generating unit.

* * * * *